United States Patent [19]

Pugh

[11] 3,868,496

[45] Feb. 25, 1975

[54] CONTROL MECHANISM FOR PRODUCING RANDOM-LIKE EFFECTS ON TEXTILE MATERIALS

[75] Inventor: Charles D. Pugh, Burlington, N.C.

[73] Assignee: Burlington Industries, Inc., Greensboro, N.C.

[22] Filed: May 15, 1973

[21] Appl. No.: 360,468

Related U.S. Application Data

[62] Division of Ser. No. 158,961, July 1, 1971, Pat. No. 3,748,648.

[52] U.S. Cl......... 235/92 PE, 235/92 CC, 235/92 R, 328/48

[51] Int. Cl. .......................................... H03k 21/36

[58] Field of Search...... 235/92 PE, 92 DM, 92 LG, 235/92 CA, 92 CC, 92 GT; 328/48, 51; 307/224, 225

[56] References Cited

UNITED STATES PATENTS

| | | | |
|---|---|---|---|
| 2,558,447 | 6/1951 | MacSorley | 235/92 DM |
| 2,970,763 | 2/1961 | Freeman | 235/92 PE |
| 3,750,603 | 8/1973 | Martin | 235/92 PE |

*Primary Examiner*—Gareth D. Shaw
*Assistant Examiner*—Joseph M. Thesz, Jr.
*Attorney, Agent, or Firm*—Cushman, Darby & Cushman

[57] ABSTRACT

A novel circuit, having a number of novel subcombinations thereof, for producing alternate on and off signals which can be used to control one or more clutches which, when activated, produce a slub on a yarn or thread or a space between slubs or for controlling any other suitable circuitry or equipment. This circuit produces an extremely long pseudo-random pattern of effect dispersion to give a true random-like appearance in cloth which is woven from such slub yarns or threads. The minimum length of the spaces and slubs can be independently set on switches which are manually accessible from the exterior of the device and also the ratio between minimum and maximum slub and space widths can be also set on other switches. The circuitry automatically causes the length of the slubs and spaces produced to vary within this range defined between the minimum and maximum values, choosing in a pseudo-random manner successive ones of a fixed number of divisions within that range. In the embodiment described below, that fixed number is 14 divisions between the minimum and maximum length of the slubs and spaces. The circuitry can further be caused to operate in a mode whereby the space or slub length remains constant and another mode in which each of the possible separations in the pseudo-random pattern is produced in succession but not necessarily in order. Similarly, the circuitry can be caused, by manual operation of a switch on the exterior of the device, to produce a slub or space of maximum or minimum length. This divisional application is particularly directed toward a counting circuit comprising a unique subcombination circuit with a first programable counter providing an output upon receipt of a given number of input signals, second and third programable counters receiving the output of the first counter, a flip-flop which shifts its output responsive to the outputs of the second and third counters and circuit logic responsive to the flip-flop for varying the program for the first counter to provide flexibility and permit production of slubs or spaces having a relatively long minimum length but relatively short maximum to maximum ratio.

2 Claims, 19 Drawing Figures

PATENTED FEB 25 1975

SHEET 17 OF 17

3,868,496

CONTROL MECHANISM FOR PRODUCING RANDOM-LIKE EFFECTS ON TEXTILE MATERIALS

This is a division of application Ser. No. 158,961 filed July 1, 1971 U.S. Pat. 3,748,648.

BRIEF DESCRIPTION OF THE PRIOR ART AND SUMMARY OF THE INVENTION

The invention relates in part to a subcombination counting circuit which in the preferred embodiment forms part of a circuit for producing alternate electrical signals, the length of which is pseudo-ramdomly determined, and to an appratus for producing slub thread or yarn.

A slub is a thickened place in a yarn or thread which, when it unintentionally results, causes a flaw in any fabric which is woven from the thread or yarn. However, if these slubs are produced at unpatterned intervals along a thread or yarn, cloth which is woven from such yarn has a pleasing appearance and is widely used for draperies and other similar fabrics. Such yarns are referred to as slub or novelty yarns. However, unless the separation between adjacent slubs is random, or at least pseudo-random, the woven cloth will have undesirable patterns appearing in it which detract from its appearance and reduce its commercial value.

One way to produce this random slub effect in yarn or thread which is being spun is by deliberately over feeding the back roller in the drafting zone on the spinning frame. This can be accomplished by connecting an electric clutch to the back roller through a conventional gear train and a mechanical over riding clutch mechanism so that the electric clutch, when energized, connects a "fast" speed to the back roll which increases the stock in the draft zone which in turn causes an enlargement in the yarn, such enlargement being a slub. The spinning frame gearing and speeds are set such that when the electric clutch is not energized the proper size of straight yarn will be produced.

One device currently employed for generating a pattern of "on" and "off" signals for the clutch to cause slubs to be produced employs a chain loop which has dogs on it which are either welded to the chain or whose position can be varied. The chain is driven around a fixed path so that the dogs successively close an electrical contact or otherwise cause the clutch to be actuated whenever a dog is encountered. Although the chain can be made to be a considerable length, the slub pattern is constant and repetitive enough so that undesirable patterns result in the woven product, which necessitate weaving on a multi-shuttle loom in an effort to reduce the patterning effect to a minimum. Varying the yarn slub pattern by changing the location of the dogs or replacing the chain is a tiresome and time-consuming activity so that it is very difficult to in any way change or control the separation between adjacent slubs or the length of the slubs themselves.

Another device which has been employed for operating clutches of the type discussed above, includes a randomizer which consists of a combination of gears, cams and micro-switches. Each randomizer has four yarn design wheels with each wheel representing a different yarn style. The styles are created by the particular physical arrangement of cams on the design wheel and the sequence in which they energize the micro-switches. As with the chain dog device, there is a definite slub pattern which causes undesirable patterns in cloth woven from the yarn. The master slub control unit in this device can only control a limited number of frames and twelve has been that number in the past. In addition, there is no way that the device can be programmed to respond quickly and rapidly to changes in styles and the only way that this can be accomplished is by changing the design wheels.

Yet another device now employed is similar to the chain type slub control mechanism and employs a precut punched paper tape which has been made in a length of 30 meters. This device permits production of yarn lengths up to 2,720 or more meters without a pattern repeat. However, the only way that slub effects can be changed is to change the tape itself and this involves a lengthy and expensive tape punching process so that the variability of the device is quite limited. Further, the slub thickness, while variable, is variable only within very narrow limits.

The present invention relates, in one of its aspects, to a novel circuit, having a number of novel subcombinations thereof, for producing alternate on and off signals which can be used to control clutches of the type discussed above or for controlling any other suitable circuitry or equipment. This circuit produces an extremely long pseudo-random pattern of effect dispersion to give a true random-like appearance in cloth which is woven from such slub yarns or threads. The minimum length of the spaces and slubs can be independently set on switches which are manually accessible from the exterior of the device and also the ratio between minimum and maximum slub and space widths can be also set on other switches. The circuitry automatically causes the length of the slubs and spaces produced to vary within this range defined between the minimum and maximum values, choosing in a pseudo-random manner successive ones of a fixed number of divisions within that range. In the embodiment described below, that fixed number is 14 divisions between the minimum and maximum length of the slubs and spaces. The circuitry can further be caused to operate in a mode whereby the space or slub length remains constant and another mode in which each of the possible separations in the pseudo-random pattern is produced in succession but not necessarily in order. Similarly, the circuitry can be caused by manual operation of a switch on the exterior of the device to produce a slub or space of maximum or minimum length.

Particularly, the invention of this divisional application relates to a unique counting circuit which, in the preferred embodiment, forms a part of the above-described circuit.

Many other objects and purposes of the invention will become clear from the following detailed description of the drawings.

DETAILED DESCRIPTION OF THE DRAWINGS

Figure 1:
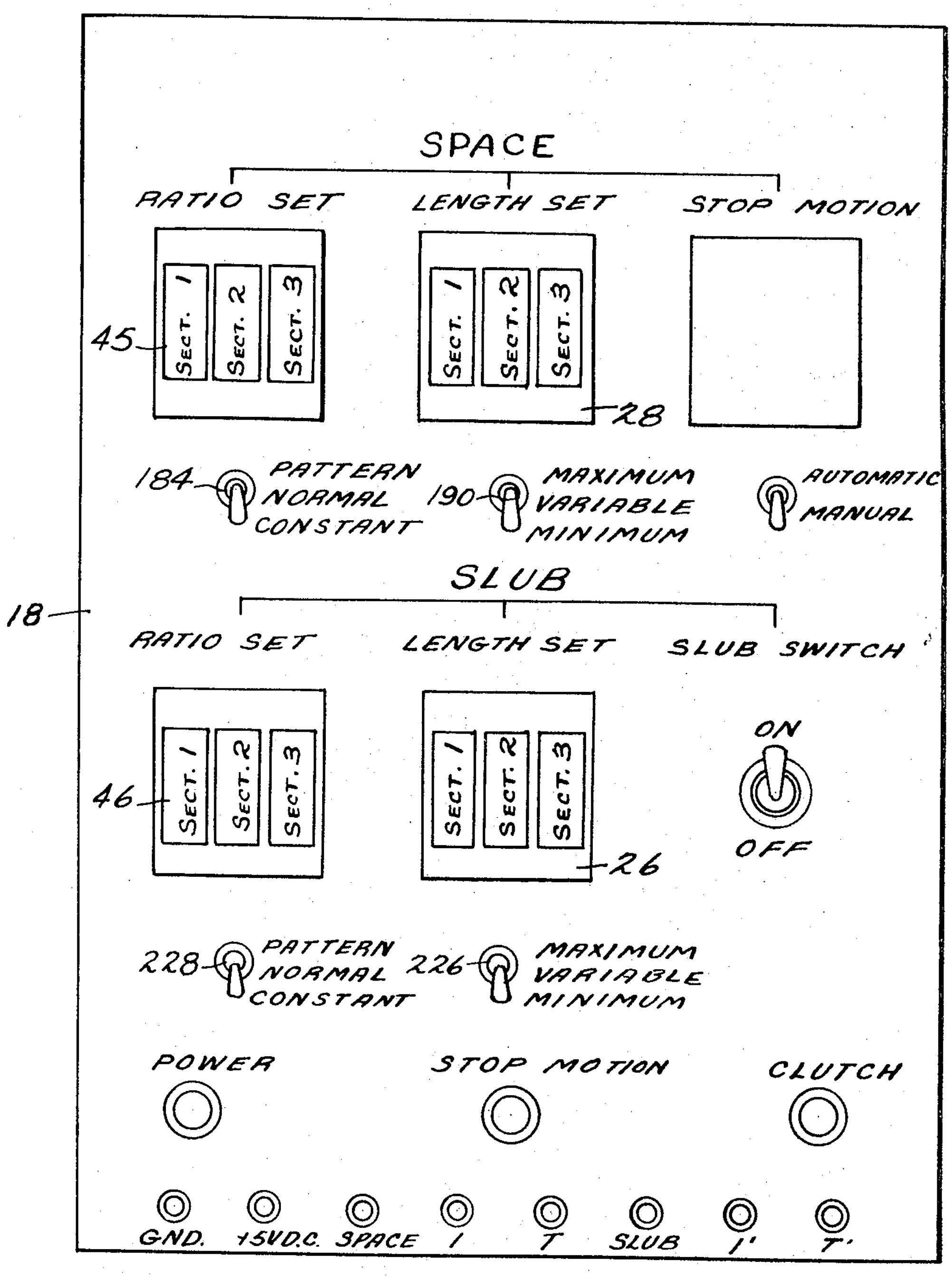
FIG. 1 shows a view of the front panel of a housing for the novel circuit of this invention with the switches which control the spaces and slubs manually accessible from the exterior of the housing.
Figure 2A:
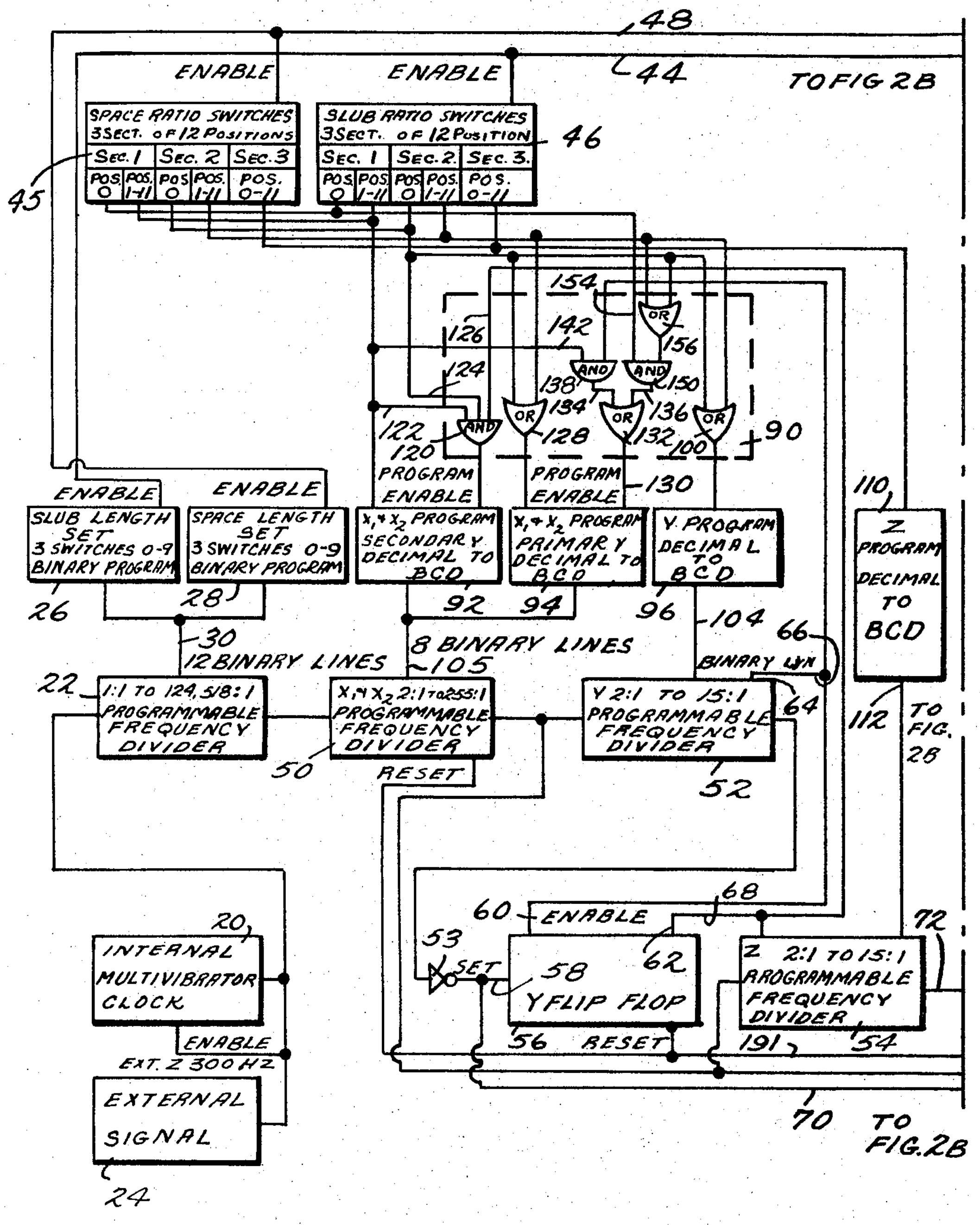
FIGS. 2A and 2B show a block diagram of one embodiment of this invention for producing alternate pulses which in turn can then be employed to produce spaces and slubs on a yarn or thread.
Figure 2B:
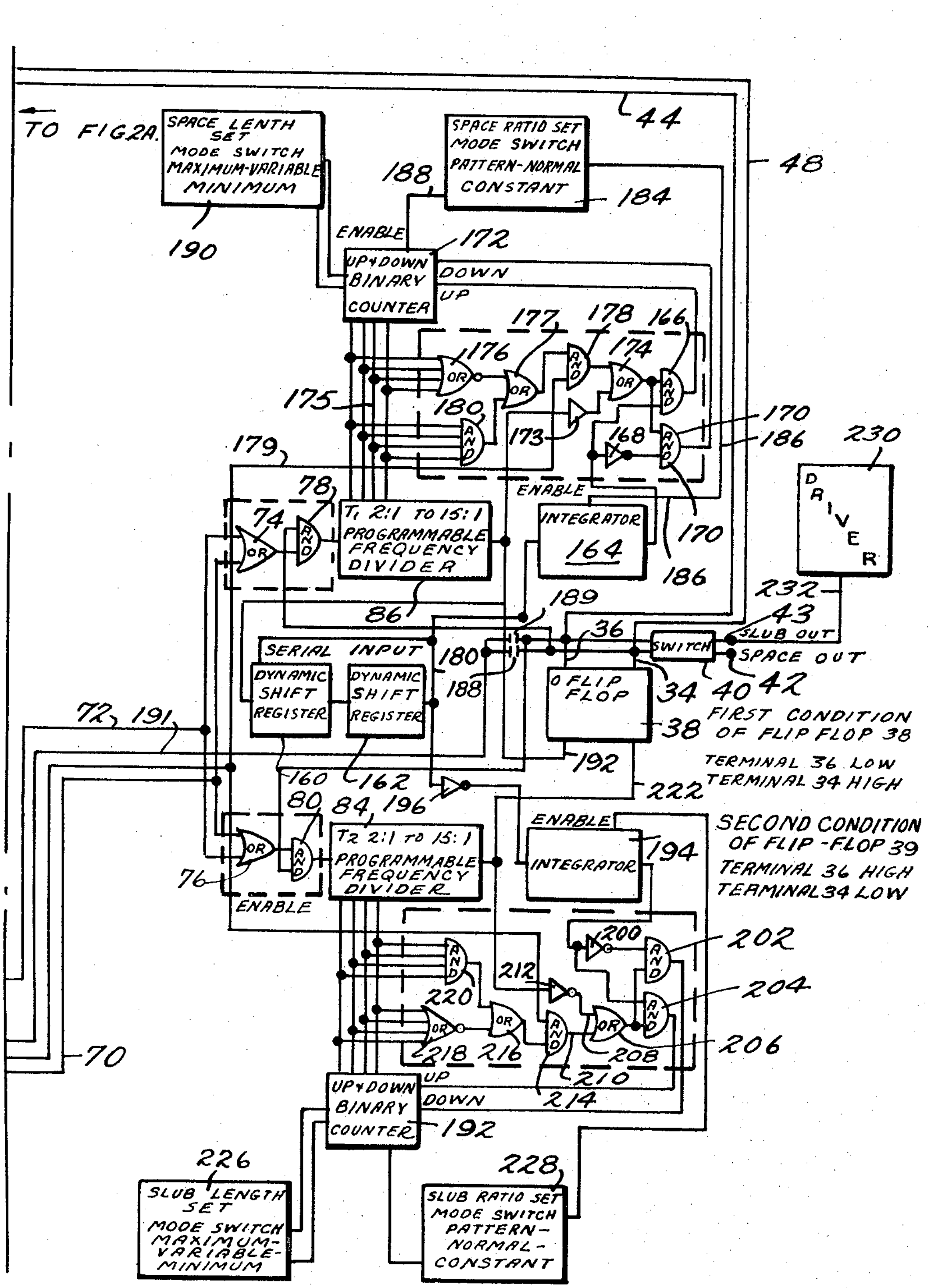

Reference is now made to FIG. 1 and to FIGS. 2A and 2B which show respectively the controls on the exterior of a conventional housing 18 which has been used for containing the novel circuitry of this invention and a block diagram of that circuitry. Referring particularly to FIGS. 2A and 2B, a pulse train at a suitable frequency, for example, 500 Hz or greater (normally 200 Khz), is produced by a conventional internal multivibrator clock 20 and applied to the input of a unique programmable frequency divider 22, which is discussed in detail below. A pulse train can also be produced by an external device, for example, equipment such as a tachometer associated with a spinning frame or other textile equipment as discussed below, and applied as the input to frequency divider 22 instead of the signals from the internal multivibrator clock 20. The frequency of such external equipment would normally be a function of the speed of operation of the equipment.

As discussed below, circuitry 24 can be provided to automatically switch to such external signals when their frequency exceeds a given predetermined level, for example, 500 Hz, so that when the frequency of the external signals is below that cut-off frequency, the output of clock 20, and not the external signals, is applied to frequency divider 22. Normal input clock frequencies for spinning frames or novelty twisters would range between 10 and 20 Khz. The internal clock allows operation of the unit before any other equipment is operating. The external signal is not required but does allow the electronic circuit to follow speed variations in textile equipment.

Two switches 26 and 28 are connected to programmable frequency divider 22 by a plurality of binary lines indicated as 30 in FIG. 2A. Referring to FIG. 1, length set switch 28 is manually accessible from the exterior of the housing 18, in which the circuitry shown in FIGS. 2A and 2B is preferably disposed, so that its three sections can be set to any of a number of different positions, each producing spaces between adjacent slubs which are not less than the minimum manually set on switch 28. Length set switch 26 is likewise manually accessible from the exterior of housing 18, as shown in FIG. 1, for setting the minimum length of slubs which are produced by the circuitry shown in block diagram in FIGS. 2A and 2B.

As shown in FIG. 2B, switches 26 and 28 are connected, by lines 44 and 48 respectively, to the output terminals 34 and 36 of conventional flip-flop 38 which, as will be apparent from the above discussion, is driven back and forth between a first output condition applying a high or logical one signal to output terminal 34 and a low or logical zero signal to output terminal 36 and a second output condition applying a low signal to output terminal 34 and a high signal to output terminal 36. When flip-flop 38 is in its first condition, applying a high signal to line 48, a signal is applied to switch 28 on line 48 which enables that switch when then applies to programming signal to divider 22 on binary lines 30. Switch 26 is disabled by the absence of a high signal on line 44 since output terminal 36 displays a low or logical zero output.

Whenever flip-flop 38 is in this first output condition whereby a high output is produced at terminal 34, switch 40, which is connected to terminals 34 and 36 as shown in FIG. 2B causes a high output signal to appear at the "space on" output terminal 42 and a low output signal at the slub output which in turn causes a first clutch, which is actuated to cause a slub to be produced, to be deactuated and a second clutch, which is actuated to cause a space to be produced to be actuated. Whenever flip-flop 38 is in its second output condition, with a high signal on terminal 36, switch 40 causes the second clutch to be deactivated and the first clutch to be actuated so that a slub is produced.

Similarly, when flip-flop 38 is shifted from its first to its second output condition in the manner described below, producing a high output at terminal 36, switch 26 is enabled by the high signal on line 44 and switch 28 is disabled by the absence of an enabling signal on line 48 so that switch 26 applies its program signal to divider 22 on binary lines 30. Thus it is possible, and in fact normal, for switches 26 and 28 to each have different lengths set therein with the length set on switch 28 representing the minimum length of the spaces between slubs and the setting on switch 26 representing the minimum length of the slubs.

Figure 7:
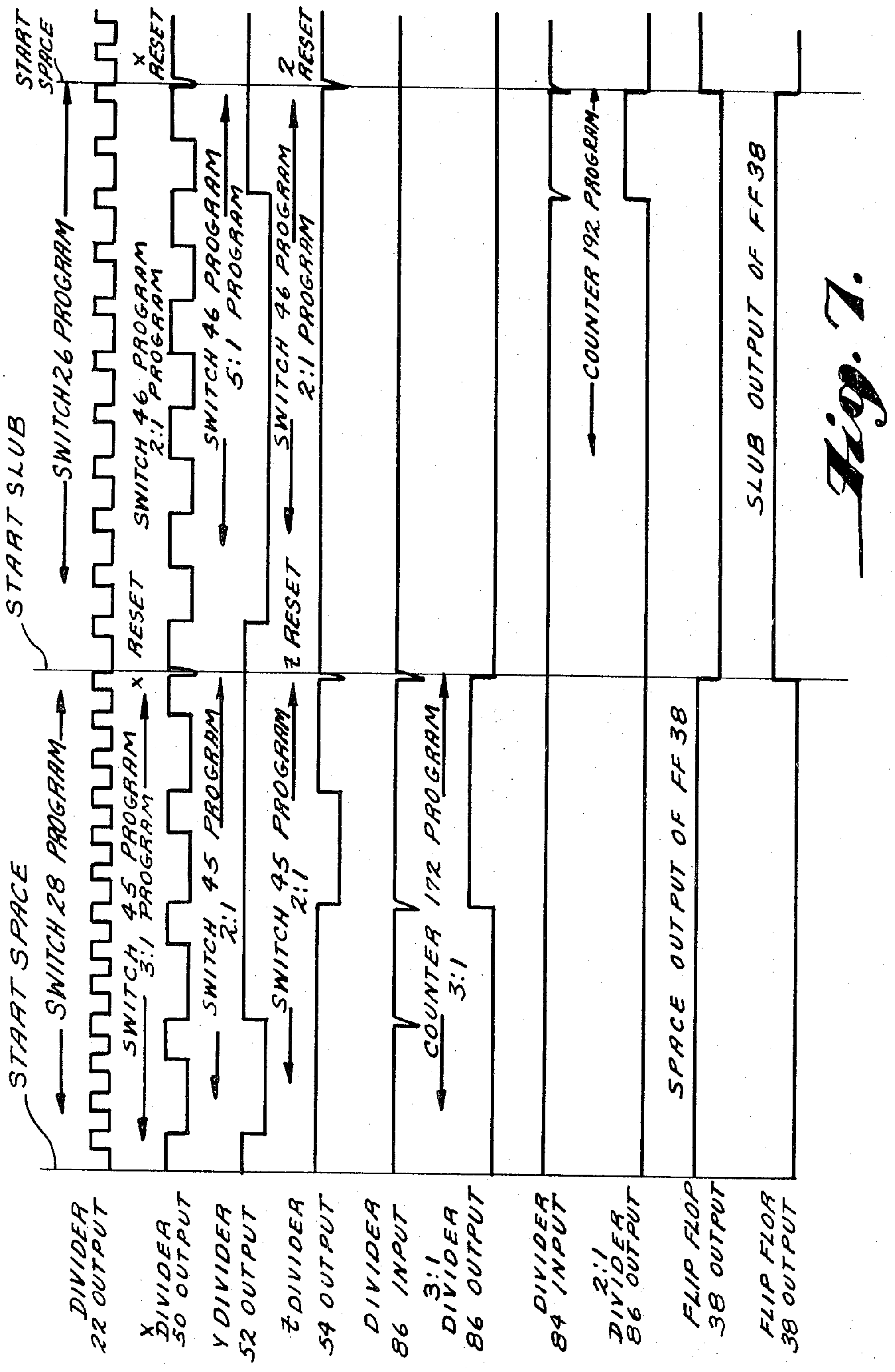
FIG. 7 shows some of the output voltages produced by the electronic components of the circuit shown in FIGS. 3A through eJ; 3J.

As is apparent from the detailed discussion below of frequency divider 22, this device produces an output signal upon each receipt of a given number of input signals, that given number being determined by the program signal being applied on lines 30 by whichever switch 26 or 28 is enabled while the input signals are being received. This output train is illustrated in FIG. 7. Further, the frequency of divider 22 is manually variable by means of switches 26 and 28 both through decades and through 10 percent of each such decade so that the range of programmable frequency divider 22 is considerable.

The circuitry connected to the output of frequency divider 22, as will be apparent from the discussion of that circuitry below, first counts a fixed number of output pulses from frequency divider 22 or an integral number close to that fixed number. This fixed number, which in the embodiment set forth below is 511, represents the minimum length of a slub or space so that it is apparent that this minimum length is directly varied by the number of input pulses upon receipt of which frequency divider 22 produces an output signal and this number can be varied directly in turn by varying the setting of switches 26 and 28. After counting the 511 or other integral number of pulses produced by frequency divider 22, the circuitry then repeatedly counts pulses produced by divider 22 to another number and produces an output signal for each time that second number of signals is produced by divider 22. The signals produced at each count of this second number each represent a division of length between the minimum and maximum lengths for slubs and spaces. These division signals are then counted and an output signal produced, which causes flip-flop 38 to change its output condition and end the slub or space which is being produced, upon a pseudo-random count of the division signals. In the embodiment described below there are fourteen divisions in the range between maximum and minimum lengths and flip-flop 38 can be caused to shift its output condition upon a count of any number of these divisions between 1 and 14, depending upon the pseudo-random pattern of the circuitry.

As shown in FIG. 1, two switches 45 and 46 are manually accessible from the out side of housing 18 which contains the circuitry shown in FIGS. 2A and 2B, for setting any given ratio between the minimum lengths of spaces and slubs respectively and the maximum lengths. As shold be apparent from the above discussion and the discussion below with respect to the detailed embodiment, the circuitry shown in FIGS. 2A and 2B automatically establishes 14 divisions between the maximum and minimum lengths of the slubs and spaces established by the manual settings of switches 26, 28, 45 and 46 and pseudo-randomly causes flip-flop 38 to change its output condition at any count of these divisions between 1 and 14. As shown in FIGS. 2A and 2B, switches 45 and 46 are connected to terminals 34 and 36, respectively, of flip-flop 38 via lines 48 and 44, respectively, such that, when flip-flop 38 is in its first condition producing a high output at terminal 34, space switch 45 is enabled, while slub switch 46 is disabled by the absence of a high output at terminal 36. Similarly, when flip-flop 38 shifts to its second output condition and produces a high output at terminal 36, slub switch 46 is enabled, while switch 45 is disabled. Switches 45 and 46 are connected to frequency dividers 50, 52 and 54, which are referred to respectively as the X (X1 and X2) divider, the Y divider and the Z divider.

X (X1 and X2) frequency divider 50 receives the output pulses from frequency divider 22 and produces an output pulse upon each receipt of a given number of input pulses from divider 22 as determined by the program established by the position of switch 45 or 46, depending upon which is enabled, which in turn depends upon whether a space or a slub is being produced. The output of frequency divider 50, as shown in FIG. 7, is applied to Y frequency divider 52 which similarly is programmed to produce an output, as shown in FIG. 7, upon receipt of a given number of input signals from X divider 50 as determined by the program established by the position of slub ratio switch 46 or space ratio switch 45, depending upon which is enabled. As will be apparent from the discussion below, the positions of switches 45 and 46 are chosen according to a predetermined program such that an output will be produced by Y frequency divider 52 upon production of a fixed integral number of output pulses by frequency divider 22. In this embodiment, that fixed number is 511 or an integral number close to it and while this number has been found to be particularly advantageous, there is no limitation of the invention to that number. Thus, if the X program divider is programmed in the 255 to 1 mode, the Y frequency divider will be programmed in the 2 to 1 mode. The additional pulse produced is required to in effect rest a further programmable divider as will be apparent from the discussion below, as will the reasons why X frequency divider 50 is capable of ratios as low as 2 to 1, as shown in FIG. 2A.

Thus, the number of output pulses from frequency divider 22 which is required to produce an output from frequency divider 52 is the product of the programmed frequency applied to frequency divider 50 as determined by switches 45 and 46 and the frequency programmed to divider 52 by those same switches. Accordingly, since this product will not be capable of being 510 in many instances, because of an inability to count less than an integral pulse, for many ratios it is necessary to count an integral number which is close to 511, for example, 508 to 515, and it will be apparent from the discussion of possible programs below how this takes place.

The output of Y frequency divider 52 is inverted by conventional inverter 53 and applied as the set input to Y flip-flop 56 which responds to the input signal thus applied at set input 58 by shifting from a first output condition in which an enabling, for example a high voltage, signal is produced at output 60 and no enabling signal at output 62 to a second condition in which an enabling signal is produced at output 62 and no enabling signal, which may be a low signal, is produced at output 60. Since no enabling signal is now applied to the output terminal 60, Y counter 52 is disabled by the absence of an enabling signal to its enabling input 64 on line 66 and similarly Z frequency divider 54 is now enabled by the application of an enabling signal to its enabling input on line 68. As should be apparent from the above discussion, Z programmable frequency divider 54 has been hitherto disabled during the time that frequency divider 52 has been counting output pulses from X frequency divider 50. After Z frequency divider 54 is enabled, it begins counting the output pulses from frequency divider 50 and Y frequency divider 52 no longer counts these pulses until flip-flop 56 is shifted back to its first output condition.

The output produced by Y frequency divider 52 is also applied via line 72 as one input to an OR gate 74, as well as an input to an OR gate 76, shown in FIG. 2B. The output of OR gate 74 is connected to AND gate 78 with the other input to AND gate 78 being connected to output teminal 34 of flip-flop 38. Similarly, the output of OR gate 76 is applied as one input to AND gate 80 with the other input to gate 80 being connected to output terminal 36 of flip-flop 38. Thus, when flip-flop 38 is in its second output condition with output terminal 36 high so that a slub is being produced, the output signals produced by Y frequency divider 52 are applied to another programmable frequency divider 84, whose operation will be discussed below and, similarly, when flip-flop 38 is in its first condition, with a high output signal produced at terminal 34 so that as space is being produced, the output signals produced by Y frequency divider 52 are applied via gates 74 and 78 to yet another programmable frequency divider 86, whose operation will also be discussed in detail below. The purpose of applying the output signal from Y frequency divider 52 to dividers 84 and 86 is to, in effect, reset these programmable frequency dividers by knocking up their output from low to high so that upon receipt of a programmed number of signals from the Z divider thereafter, the output of divider 84 or 86 goes low again causing flip-flop 38 to shift to its output condition. As mentioned above, the production of an output signal by Y frequency divider 52, in effect, represents the minimum length chosen and set on switch 28 and 26 for a space and slub, respectively.

After flip-flop 56 changes its output condition as described above to provide an enabling output signal on line 62 and to terminate the production of an enabling output on line 60, Z programmable frequency divider 54 counts the output signals from X programmable frequency divider 50 and produces an output signal, as shown in FIG. 7, upon receipt of a given number of input signals from divider 50 as determined by the position of switch 45 or 46, depending upon which switch is enabled. Thus Z frequency divider 54 produces a train of output signals, the separation between adjacent signals each representing an equal length division in a range which is in effect determined by the settings of ratio switches 45 and 46. As will be apparent from the discussion below, the circuitry operates to change the condition of flip-flop 38 and terminate the space or slub being produced upon a pseudo-random count of a number of these divisions in the range between 1 and 14. It is apparent that another range having another number of divisions could be alternately employed, if desired.

Referring further to FIG. 2A, switches 45 and 46 each have three sections which are connected to programmable frequency dividers 50 and 52 via logic 90 as well as conventional decimal to binary coded decimal converters 92, 94 and 96. As shown, OR gate 100 is connected to the second section of switches 45 and 46 and connects that second section to the decimal to binary coded decimal converter 96 which in turn provides a program to divider 52 on a plurality of binary lines indicated generally as 104. Similarly, the third section of switches 45 and 46 is connected to the decimal to binary coded decimal converter 110 which applies its output on lines 112 to Z programmable frequency divider 54 to program that divider to the desired frequency.

The first section of switches 45 and 46 controls the frequency of X programmable frequency divider 50 and is connected to the two decimal to binary coded decimal converters 92 and 94 by a portion of logic 90. The purpose of this portion of logic 90 is to provide a first program signal to the X divider 50 on lines 105 when Y flip-flop 56 is in its first output condition and X divider 50 is counting the initial 511, or other fixed number close to 511, pulses and second program signal, which may be different, to frequency divider 50 thereafter. The purpose of these different signals is to increase the flexibility of the circuitry since, without this capability, the circuitry would not be able, for example, to produce slubs or spaces having a relatively long minimum length but a relatively short maximum to minimum ratio because the product of the X frequency and Z frequency could not be made small enough by minimizing the frequency of divider 54. By permitting reprogramming, if necessary, of X frequency divider 50 after the minimum length signal is produced, the length divisions between minimum and maximum can be chosen to be as small as desired.

Referring to logic 90 in FIG. 2A, AND gate 120 is connected with its output connected to an enabling input for the binary coded decimal converter 92 such that unless AND gate 120 produces a high output, no program signal is produced and applied by converter 92. One input to AND gate 120 is connected to Section 1 of switches 46 and 45 so that a logical one input is applied on line 122 to AND gate 120 only when these switches are in positions 1 to 11. The second input to gate 120 is connected to Section 2 of switches 45 and 46 such that a logical 1 is applied on line 124 only when Section 2 is in the zero position. The third input to gate 120 is connected to output 52 of Y flip-flop 56 so that a logical one is applied to line 126 only when flip-flop 56 is in its second output condition, following the receipt of a set signal at set input 58 from Y frequency divider 52. Thus when Section 1 of the switches 45 and 46 is in any of positions 1 to 11, Section 2 is in position zero and flip-flop 62 is in its second output condition, to which it is shifted upon receipt of a signal from frequency divider 52, binary coded decimal converter 92 imposes its program signal on X divider 50 after the minimum length signal has been produced.

Section 2 of switches 45 and 46 is also connected to the primary coded decimal converter 94 via OR gate 128. Also connected to an enabling input 130 to binary coded decimal converter 94 is an OR gate 132, having two inputs on lines 134 and 136. The output of AND gate 138 is connected to input line 134 of OR gate 132 and the two inputs to AND gate 138 are connected respectively to Section 1 such that a logical one is provided on line 142 only when Section 1 is in any of positions 1 to 11 and to the output 60 of flip-flop 56 which provides a logical one only when in its first condition prior to the reception of a signal at set input 58 from Y frequency divider 52.

The output of AND gate 150 is connected via input line 136 to OR gate 132 and AND gate 150 itself has two inputs. One of the inputs to AND gate 150 is connected to Section 1 of switches 45 and 46 so that a logical one is provided on line 154 only when Section 1 is in its zero position. The other input to AND gate 150 is provided from OR gate 156 and the two inputs to OR gate 156 are connected to Section 2 of switches 45 and 46 such that a logical one is provided at the output of OR gate 156 when Section 2 is set in either the zero or any of its 1 to 11 positions. Thus, when the Section 1 switch is in its zero position and the Section 2 switch is in any position, the primary decimal to binary coded decimal converter 94 is enabled. However, when the Section 1 switch is in any of positions 1 to 11, converter 94 is enabled only until flip-flop 56 shifts its output condition in response to a signal provided at set input 58 by frequency divider 52 and then converter 92 is enabled to reprogram X frequency divider 50, which then provides pulses which are counted by Z divider 54 which in turn produces pulses which each represent a division within the range between minimum and maximum as discussed above. In short, when Section 1 is in its zero position and Section 2 is in any of positions 1 to 11, then X divider 50 is not reprogrammed when flip-flop 56 shifts from its first to second condition. However, when Section 1 is in any of its positions 1 to 11 and Section 2 is in its zero position, the shifting of flip-flop 56 causes X divider 50 to be reprogrammed.

The output pulses provided by Z frequency divider 54 are applied to OR gates 74 and 76 which, as mentioned above, have connected as their other input the output of Y frequency divider 52, which was disabled by the shifting of flip-flop 56 from its first to second condition as discussed above. The outputs of gates 74 and 76 are respectively applied to AND gates 78 and 80 which have, as their other inputs, lines connected to output terminals 34 and 36 of flip-flop 38, respectively, such that when a space is being produced the output of frequency divider 54 is passed through AND gate 78 and the pulses thus passed counted by programmable frequency divider 86. Conversely, when a slub is being produced, AND gate 80 is enabled to permit the pulses produced by frequency divider 54 to pass through AND gate 80 and be counted by programmable frequency divider 84.

As mentioned above, programmable frequency dividers 84 and 86 are programmed by circuitry which pseudo-randomly causes the frequency dividers 84 and 86 to produce an output, as shown in FIG. 7 where divider 84 shifts from its high to its low condition upon receipt of four pulses from Y divider 52 and Z divider 54, upon counting of different numbers of pulses received from frequency dividers 52 and 54. The first pulse produced by frequency divider 52 and applied to one of the dividers 84 and 86 causes that divider in effect to reset and knock up the output voltage from a low to a high level. The circuitry thereafter is programmed to cause dividers 84 and 86 to provide an output signal upon receipt of a number between 1 to 14 of pulses from Z frequency divider 54.

The circuitry which pseudo-randomly programs frequency dividers 84 and 86 includes first and second shift registers 160 and 162 which comprise a 255 bit dynamic shift register. The output of shift register 160 is connected to the input shift register 162 and the output of shift register 162 is in turn connected as a serial input to shift register 160 so that, when an enabling signal is applied, the contents of these two registers are circulated through a complete cycle, although the bits will not be in the same order at the end of that cycle, with the output of shift register 162 continually read back in as the input to shift register 160. The output of shift register 162 is also applied to an integrating circuit 164 which produces an output which is chosen such that the output is, in effect, a logical one roughly half of the time and a logical zero the rest of the time, with the pattern being pseudo-random.

The bit pattern of shift registers 160 and 162 is a serial pattern formed by feeding the serial output of the dynamic shift register back into the serial input and clocking this input through the register with the output of $T_1$. The unit operates as a conventional 8, 5, 3, 1, 0 Shift Register, and the original serial pattern is generated by logically exclusive "OR"ing the 8, 5, 3, 1 state back into the serial input which yields a 255 bit sequence.

The output of integrator 164 is applied as one input to AND gate 166 and also is inverted by inverter 168 and applied as one input to AND gate 170. Thus, when the output of integrator 164 is a logical one, a logical one is applied as one input to AND gate 166 and a logical zero as one input to AND gate 170. Conversely, when the output of integrator 164 is a logical zero, a logical zero is applied as one input to AND gate 166, while a logical one is applied as one input to AND gate 170. The output of AND gate 170 is applied to the down input of a conventional up and down binary counter 172 such that when an output is provided by AND gate 170, binary counter 172 decreases the count therein by one. Similarly, the output of AND gate 166 is applied to the up input of binary counter 172 so that each time an output is provided by AND gate 166 the count in binary up and down counter 172 increases by one.

The other input to AND gates 170 and 166 is connected to the output of an OR gate 174 which provides an output to AND gates 166 and 170 to apply an up or down count to binary counter 172 when either of its inputs are a logical one. One of the inputs to OR gate 174 is connected to the output of programmable frequency divider 86, via inverter 173, so that a logical one is provided to one input to gate 174 whenever the output of frequency divider 86 shifts from its high to its low state at the programmed count. Thus, each time divider 86 produces an output signal which causes flip-flop to shift its output condition, AND gate 166 or 170 is enabled briefly to add or subtract one from the count in binary counter 172 and thus change the program which is accepted by divider 86 at the beginning of the next count therein after flip-flop 38 again shifts back to its first output condition.

To prevent counter 172 from assuming an all 1 or all zero state which will provide forbidden programs to divider 86, logic is included to spin counter 172 through a count, which may be several decades. Whenever the output of counter 172 is comprised of all logical zones, NOR gate 176 provides a logical one input to OR gate 177, whose output is connected as one input to AND gate 178. The other input to AND gate 178 is connected via line 179 to the output of X frequency divider 50 and the output of AND gate 178 is connected as an input to OR gate 174. Similarly, when lines 175 each bear a logical one, AND gate 180 applies a logical one to the other input to OR gate 174. Thus, whenever all zeros or all ones are detected, each output pulse from divider 50 causes a signal to be applied to the up or down input to binary counter 172, depending upon whether AND gate 166 or AND gate 170 is enabled by integrator 164. Because the frequency of the output of X divider 50 is normally fairly high, counter 172 may be spun through several decades before AND gate 178 is disabled.

The programs supplied by binary counter 172 are preferably not in order of progressive lengths within the range defined by switches 26, 28, 44 and 45. It is not desirable that a binary count of 2 be associated with 2 to 1 frequency, a binary count of 3 with a 3 to 1 frequency, a binary count of 4 with a 4 to 1 frequency, etc. It is preferable that the frequency associated with each of the counts in counter 172 be mixed so that a count of 2 in binary counter 172 might be associated with a frequency of 14 in divider 86, a count of 3 might be associated with a frequency of 4, a count of 4 might be associated with a frequency of 7, etc.

A manually operable Space Ratio Set Mode switch 184 is preferably mounted on the exterior of housing 18 as shown in FIG. 1 so as to be manually adjustable from the exterior thereof, through three positions as shown - - a Pattern, Normal and Constant position. In the normal position, Space Ratio Set Mode Switch 184 has no effect on the operation of counter 172, integrator 164 and programmable frequency divider 86 which then operate in the manner set forth above. In the Constant position, Space Mode Set Switch 184 provides a disabling or lack of enabling signal to integrator 164 on line 186 which prevents that integrator from supplying its signals to AND gates 166 and 170 and also a disabling or lack of enabling signal to counter 172 on line 188 so that the count in the binary counter 172 remains the same and accordingly frequency divider 86 produces an output at the same count for each successive space so that the interval between adjacent slubs remains constant.

In the third mode of operation termed the Pattern mode, switch 184 provides a disabling signal to integrator 164 but still enables binary counter 172. As will be apparent from the detailed discussion of the circuitry below, disabling integrator 164 provides a logical one input to AND gate 170 so that each time divider 86 produces its output signal to cause flip-flop 38 to shift from its first to second output condition, AND gate 170 produces an output which decreases the count in counter 172 by one. Thus, binary counter 172 runs through each of the possible separations between adjacent slubs, although of course these separations would not be in order because the counts in binary counter 172 preferably do not match the frequencies programmed in frequency divider 86 as mentioned above.

A space length switch 190 is also provided and mounted on the exterior of the housing 18 as shown in FIG. 1 for controlling the minimum length of the spaces produced in the range established by switch 45. When switch 190 is in the variable position, it in no way affects the operation discussed above which continues normally. When switch 190 is in the maximum position, it imposes a program on frequency divider 86 which causes that frequency divider to operate at its minimum frequency so that each successive space is of maximum length. Similarly, when in the minimum position, switch 190 imposes a program on frequency divider 86 which causes that divider to operate at its maximum frequency so that each successive space is of minimum length.

The output of programmable divider 86 is applied to one input 192 of flip-flop 38 so that when flip-flop 38 is in its first condition applying a high output to line 34, the signal applied to input 192 by the shifting of frequency divider 86 from its high to its low position upon the programmed count causes flip-flop 38 to shift to its second condition applying a high output to terminal 36. This shift of flip-flop 38 so that a high output is produced at terminal 36 and a low output at terminal 34 disables space length and space ratio switches 28 and 45, and enables slub length switch 26 and slub ratio switch 46. This shift also causes a reset signal to be applied via coupling capacitor 188 or 189 to Y flip-flop 56 via line 191 to cause it to shift back from its second to its first output condition and again enable Y frequency divider 52 and disable Z frequency divider 54. The reset signal is also applied via line 191 to X frequency divider 50 as shown to reset that divider as well.

Figure 8:
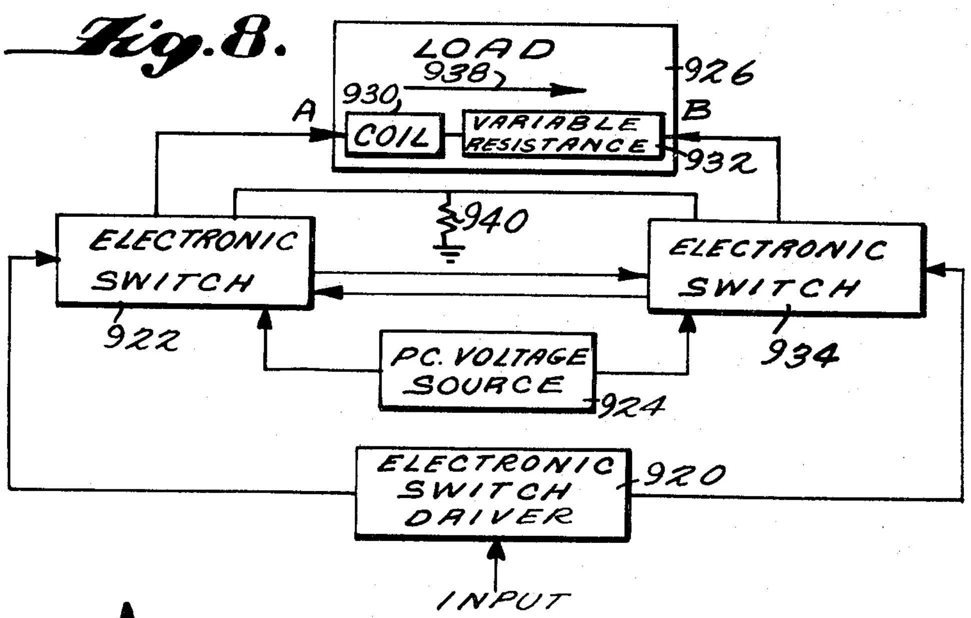
FIG. 8 shows a block diagram of the driver circuit which receives the output signals from the circuit of FIGS. 2 and 3 and operates the slub and space clutches.
Figure 10:
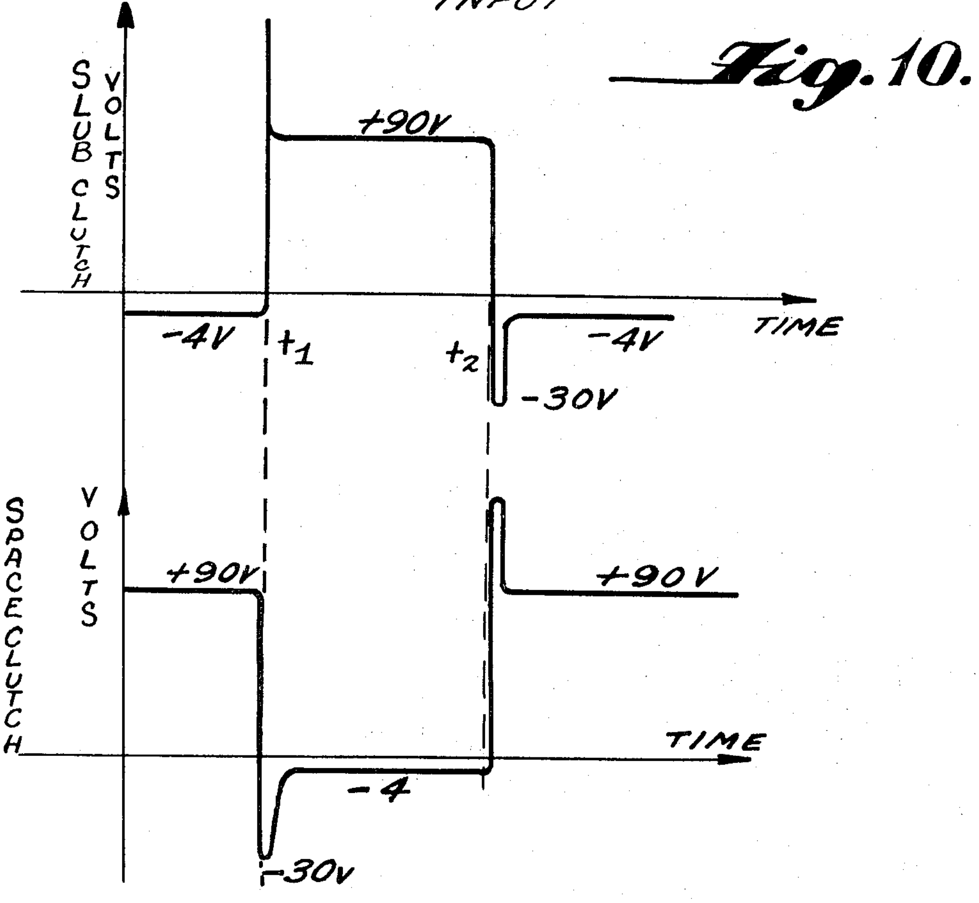
FIG. 10 shows the voltages across the slub and driver clutches as the driver circuit of FIGS. 4 and 5 shifts back and forth between its two output conditions.
Figure 9:
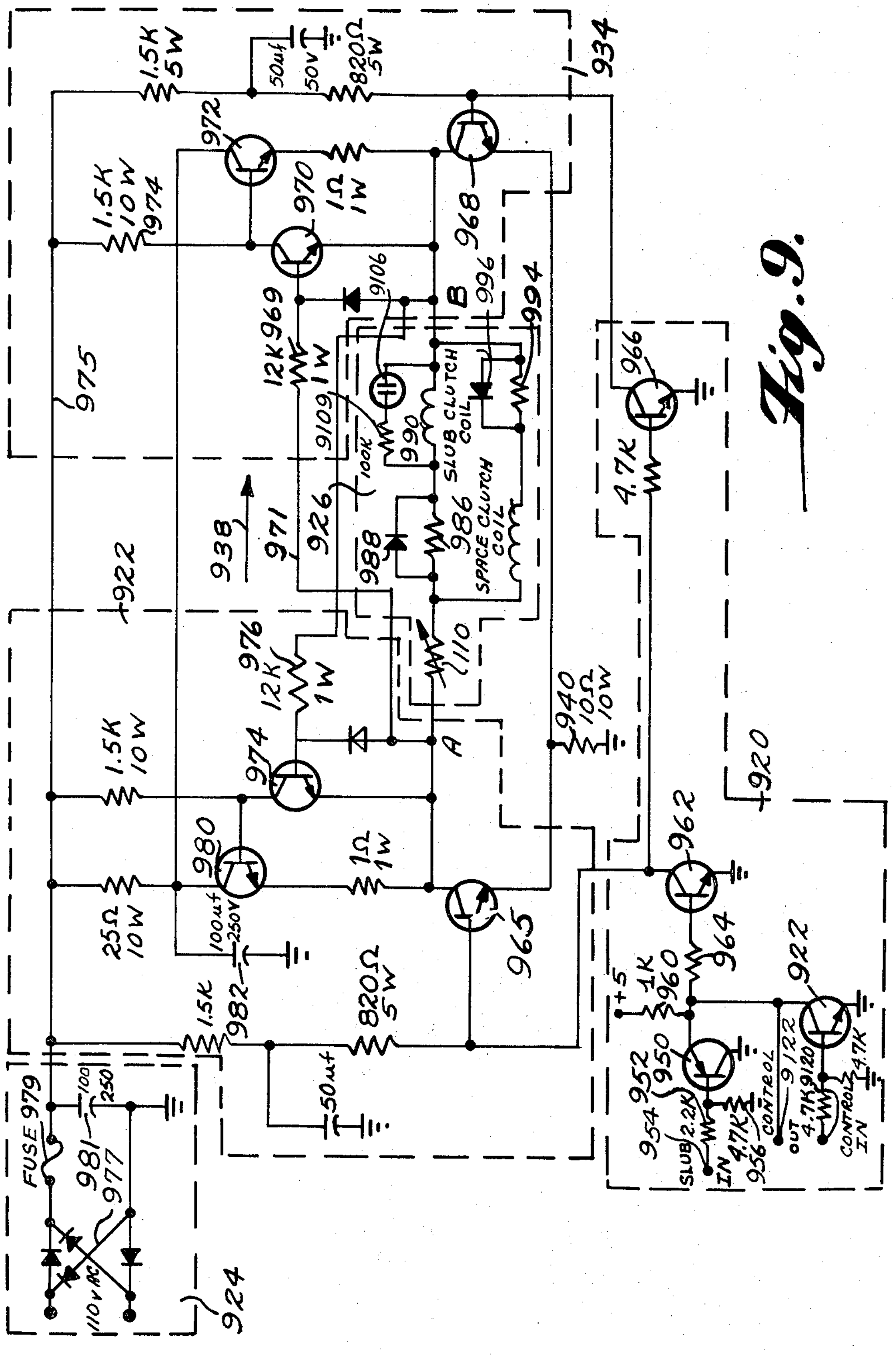
FIG. 9 shows a detailed schematic of the driver circuit of FIG. 8.

Dividers 22, 50, 52 and 54 now begin a new count controlled by the slub ratio switch 46 and the slub length switch 26 in the same fashion described above. The output of frequency dividers 52 and 54 is now applied to frequency divider 84 via AND gate 80 which is enabled by the high output at terminal 36 with AND gate 78 now disabled by the absence of an output at terminal 34. A binary counter 192 programs frequency divider 84 in the same fashion as binary counter 172 programs divider 86, and up and down counter 192 is similarly connected to an integrator 194 which is connected to the output of dynamic shaft register 162 via inverter 196. The output of integrator 194 is applied via an inverter 200 as one input to AND gate 202 and also applied directly as one input to AND gate 204. Similar to the other circuitry described above, the other inputs to AND gates 202 and 204 are connected to the output of OR gate 206 which has two inputs 208 and 210. The output of programmable frequency divider 84 is applied to input 210 via inverter 212, while the input 210 is connected to the output of an AND gate 214 which has two outputs, one connected to the output of X frequency divider 50 and the other connected to the output of OR gate 216, which produces an output signal whenever the programmed signal to frequency divider 84 is all zeros or all ones which, as discussed above, are undesirable conditions. When either of these conditions is detected by OR gate 218 or AND gate 220, OR gate 216 provides a logical one to AND gate 214 so that each receipt of a pulse from X frequency divider 50 causes binary counter 192 to move up or down out of the undesired programs according to the state of integrator 194. The output of programmable frequency divider 84 is applied to input 222 of flip-flop 38 to cause flip-flop 28 to shift back to its first condition and cease the production of a slub when divider 84 shifts back to its low condition upon the pseudo-random count. When this occurs, switches 26 and 46 are disabled and switches 45 and 28 again enabled in order to now produce a space in the manner described above. Production of spaces and slubs proceeds alternately as described. Slub length switch 226 and Slub Ratio Set Switch 228 are mounted for manual access from the exterior of housing 18 as shown in FIG. 1 and perform the same functions for the slub portion of the cycle that switches 184 and 190 perform for the space portion of the cycle. The circuitry shown in FIG. 2 causes a space to be produced when flip-flop 38 is in its first condition and a slub to be produced when flip-flop 38 is in its second condition. This is preferably accomplished, as mentioned above, by applying the output signals from flip-flip 38 to unique driver circuitry 230 on line 232, such as shown in FIGS. 8 and 9. Since the outputs of flip-flop 38 are each the reverse of the other it is only necessary to apply one of the outputs to driver circuitry 230 and the slub output terminal is connected to driver circuitry 230 in FIG. 2B.

Driver circuitry 230, as discussed in detail below, provides a voltage of polarity across two parallel connected circuits, each comprising a coil connected in series with a parallel connected resistor and diode as shown in FIG. 8. When the flip-flop is in a first condition, the voltage across this circuit is a first polarity so that a substantial voltage is provided across one of the coils, which is the coil which is actuated to cause a space to be produced and a small reverse bias voltage across the other coil, which is the coil which is actuated to cause a slub to be produced. This reverse bias voltage operates to demagnetize the unactuated coil and increases the speed and reliability of operation of the coil when it is thereafter actuated as flip-flop 38 shifts into its other condition. As mentioned above, driver circuit 230 can be used in many other applications and is further discussed and specifically claimed in a copending application, the disclosure of which is explicitly incorporated herein by reference. This copending application is entitled "Drvier Circuitry" filed herewith by the same inventor of this application and is U.S. Pat. No. 3,736,473.

Reference is now made to FIG. 3 which shows a detailed schematic of the circuitry shown in FIG. 2 in block diagram. As can be seen in FIG. 3D internal multi-vibrator clock 20 includes a pair of conventional transistors 300 and 302 which are conventionally connected to form an astable flip-flop which alternately shifts back and forth between its two states, thus conventionally providing a string of output pulses on line 304 via conventional driver transistor 306. Clock 20 will run free at a given frequency, for example 200 Khz, if no external clock pulse is available. It can be controlled to operate between 100 Khz and 200 Khz, as a slave tracking oscillator when a proper external tachometer signal is provided at the external clock input.

A circuit 24 for receiving an external clock input, for example, from a tachometer associated with textile equipment or the like, and imposing the frequency of the external input upon clock 20 is connected via line 310 and resistor 309 and 313 to transistors 300 and 302 and circuitry 24 contains conventional circuitry for amplifying the signal and applying it to the flip-flop so as to cause the flip-flop to operate at the speed set by external clock input. The internal multi-vibrator frequency of clock 20 is controlled by fixed current sources, including transistors 305 and 307, and the bias voltage on line 310 as determined by resistors 309, 311 and 313. When no external signal is applied, transistor 315 is set at a conduction level by resistor 317 to provide the proper bias level for 200 Khz or any other given frequency.

The range of operation of the external clock input circuit 24 can be easily modified to operate for each particular application by simply adjusting variable resistor 317. For example, if in normal operation, a spinning frame could vary from 500 to 1,000 RPM cylinder speed the external clock input circuit could be designed such that a suitable tachometer signal fed from the cylinder speed would operate the Schmidt Trigger including transistors 319 and 321 to charge up capacitor 323 through diode 325 such that the voltage level of capacitor 323 controls the conduction of transistor 327 and hence the voltage at the collector of transistor 327. As the voltage level of capacitor 323 increases, the collector voltage of transistor 327 decreases. A point would be reached where transistor 315 would turn off and no longer have effect on the bias level of resistors 309 and 313 and then only the conduction of transistors 327 controls this bias. As the junction of resistors 309 and 311 increases in bias, the internal multi-vibrator frequency decreases, and vice versa.

As can be seen from the circuit, as the external clock frequency increases, it causes the voltage level of capacitor 323 to increase, which lowers the bias voltage on resistors 309 and 313 through the decreasing collector voltage of transistor 315.

All external clock inputs would be set up such that at the lower cylinder speed limit, the external clock input would cause the internal multi-vibrator to operate at, for example, 100 Khz, whereas at the upper limit, the operation would be, for example, 200 Khz. These frequencies are arbitrary and have been picked only from practical experience.

Figure 3A:
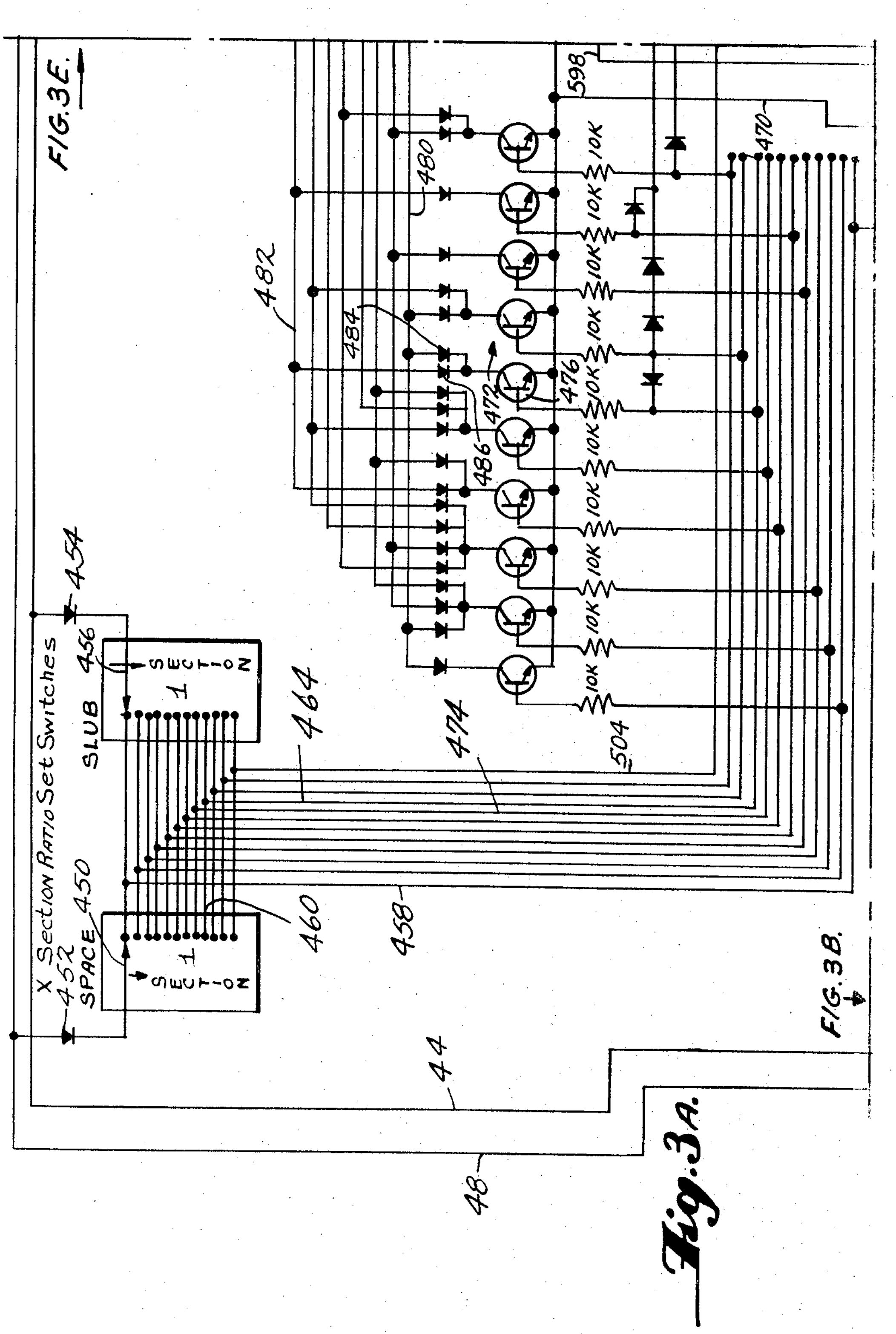
FIGS. 3A through 3J show a detailed circuit schematic of the embodiment of the invention shown in block diagram in FIGS. 2A and 2B.
Figure 3B:
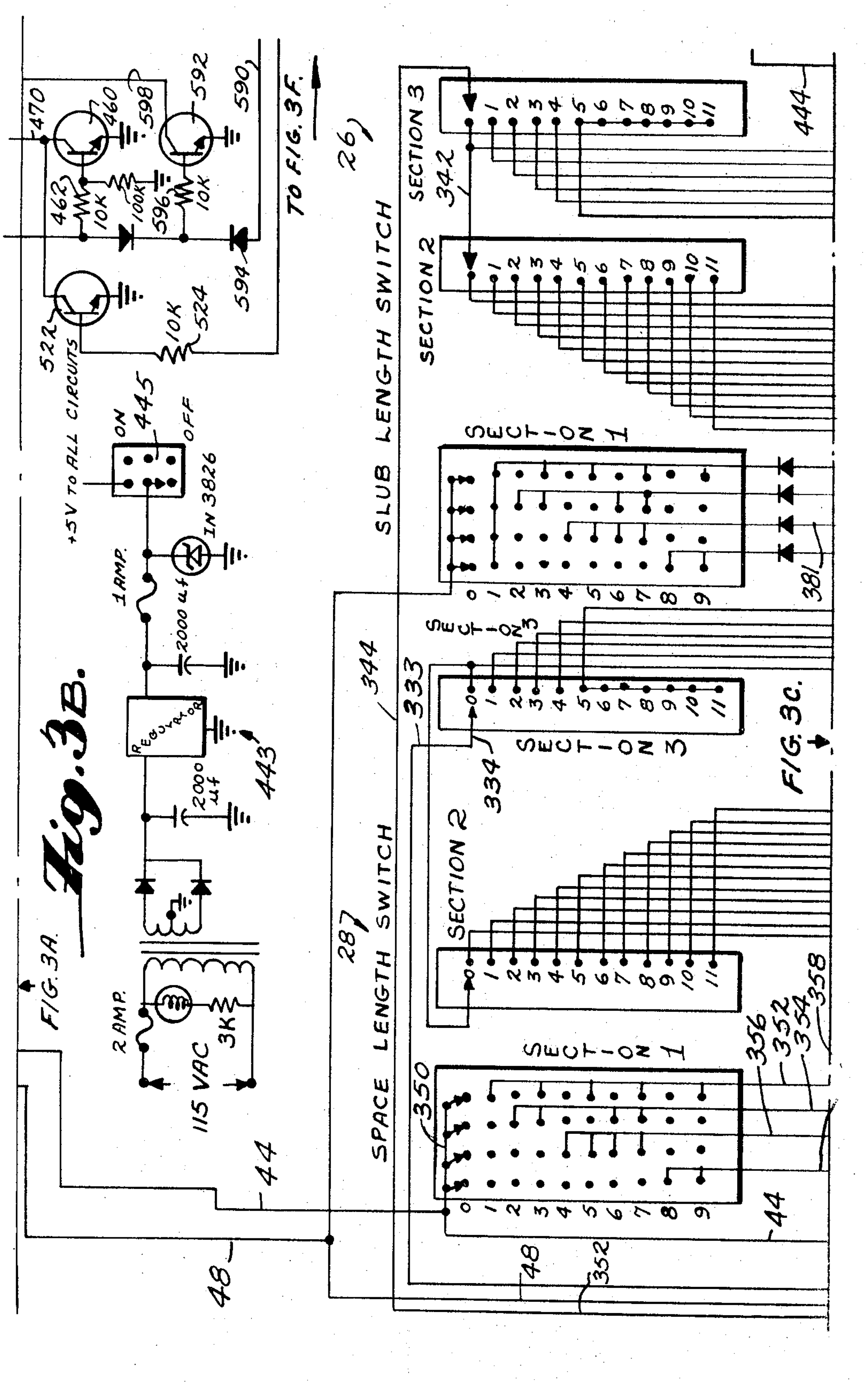
Figures 3B, 3C, 3D:
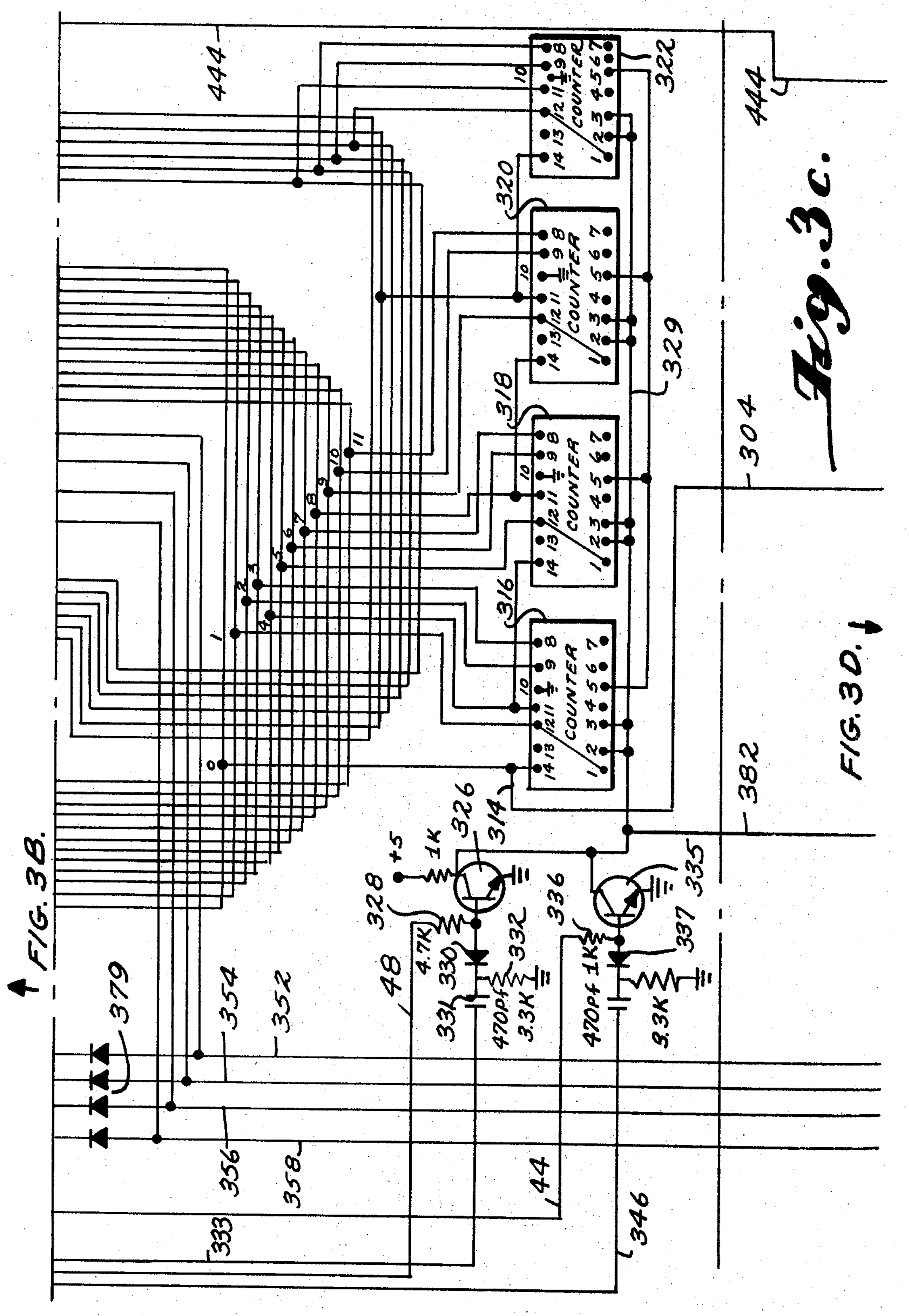
Figure 3D:
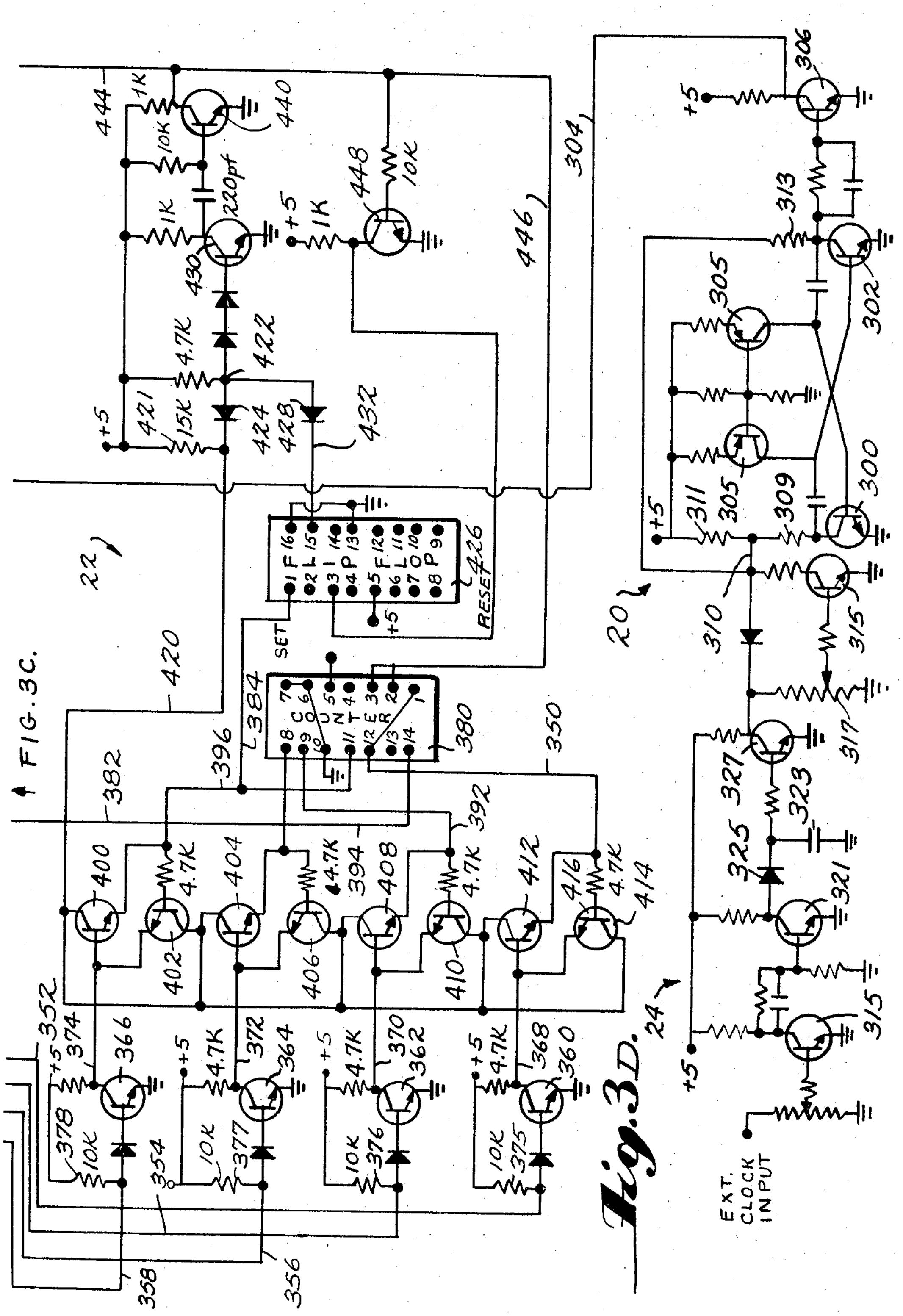
Figure 3E:
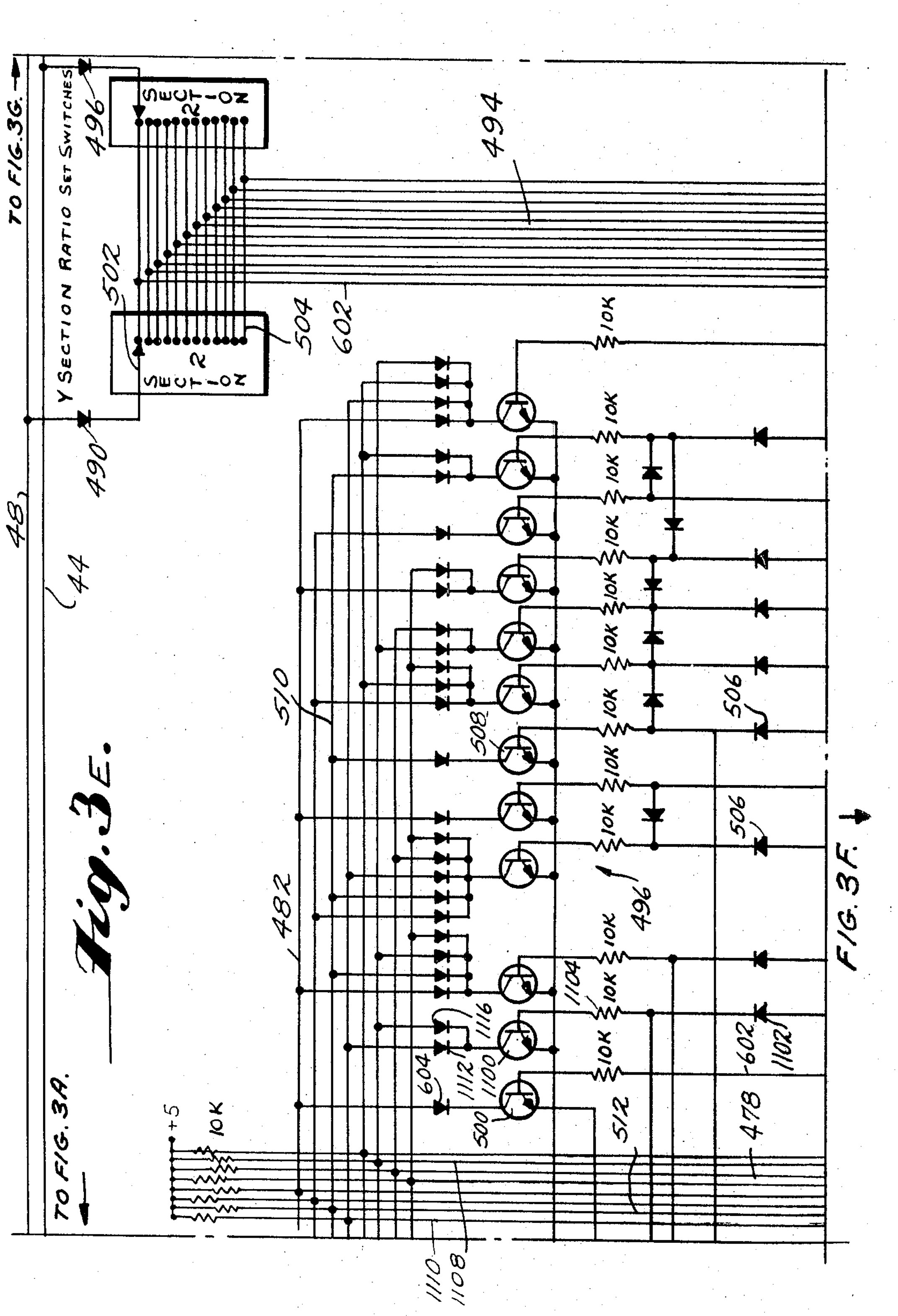

The pulse train produced by clock 20 is applied to line 304, which is connected to the input pin 14 of a conventional counting circuit 316, shown in FIG. 3C. Circuits 318, 320 and 322 are cascaded to counter 316 so as to, in effect, produce a counter which produces an output pulse on line 329 each time that the composite counter comprised of individual counters 316, 318, 320 and 322 reaches the count which is set on switches 26 and 28. Circuits 316, 318, 320 and 322 can each be a standard binary frequency counter hooked up, as shown, as a 16 bit counter. This output on line 329 is also applied to the reset inputs of counters 316, 318, 320 and 322 to reset these counters to zero upon reaching the desired count.

Switches 26 and 28, as shown in FIG. 3B, are each comprised of three sections having different positions connecting to the different outputs of counters 316, 318, 320 and 322 to reset the counters on a count determined by those switch positions. The base of transistor 326 in FIG. 3B is connected via resistor 328 to line 48 which connects to the output of flip-flop circuitry 38 with a high signal applied to line 48 whenever the flip-flop 38 is in its first condition and a space is to be produced. This high signal causes transistor 326 to saturate and ground reset line 329. The base of transistor 326 is connected, via diode 330, to a differentiating circuit comprised of resistor 332 and capacitor 331, and via line 333 to movable arm 334 of Section 1 of space length switch 28, shown in FIG. 3B.

The successive pulses from clock 20 on line 304 are thus received at pin 14 of counter 316 and the receipt of each pulse increases the count in the cascaded counters by one. When the count in counters 316, 318, 320 and 322 matches the count set on Sections 2 and 3 of switch 28, a low signal is coupled to line 333 by arm 344. This low signal is differentiated by resistor 332 and capacitor 331 so that a negative pulse is applied via diode 330 to the base of transistor 326, driving that transistor into non-conduction and applying a high signal to line 329. This high signal is applied as shown to the reset inputs to counters 316, 318, 320 and 322 to reset each of these counters to zero. The positive pulse produced by the differentiating circuit comprised of resistor 332 and capacitor 331 as line 333 returns to a high level is blocked by diode 330.

While line 48 is high and a space is being produced, line 44 is low so that a low input is applied to the base of transistor 335 via resistor 336. Transistor 335 is thus kept in its non-conductive condition so that the negative pulse coupled to the base of transistor 335 by diode 337, when the count as determined by the position of slub length switch 26 is reached, has no effect. When flip-flop 38 shifts to its second output condition, applying a high output to line 44 and a low output to line 46, transistor 335 is driven into its saturation region, while transistor 326 becomes non-conductive, so that the position of swich 26 rather than the position of switch 28 determines the count in counters 316, 318, 320 and 322 at which these counters are reset by a positive pulse on line 329.

Section 1 of space length switch 28 includes an arm 350 which is connected to line 44 as shown so that, when the flip-flop 38 is in its first condition in which a space is to be produced, a low voltage is applied to arm 350 which is manually movable through a plurality of positions indicated as 0–9. Each of these positions imposes a pattern of low voltage and no low voltage onto lines 352, 354, 356 and 358 and these lines are respectively connected to the bases of transistors 360, 362, 364 and 366 as shown in FIG. 3D so that these transistors are kept conductive by the associated bias resistors 375, 376, 377 and 378 respectively to ground their associated output lines 368, 370, 372, and 374 whenever the associated output line from Section 1 of the space length switch 28 is not coupled to line 44, which, as mentioned above, is low while a space is being produced. The diodes indicated as 379 isolate Section 3 of switch 28 from section 3 of switch 26 and the diodes indicated as 381 isolate Section 3 of switch 26 from Section 3 of switch 28.

The reset positive pulse produced by transistor 326 or 335, which is produced when the count in the counter circuit comprised of counters 316, 318, 320 and 322 is equal to that set on switches 26 and 28, is applied to another conventional decade counter 380 shown in FIG. 3D so that counter 380 advances its count by one each time a signal is received on line 382 which connects to line 329 as shown. Counter 380 similarly produces an output whenever the count therein matches the programmed count determined by Section 3 of switch 28 or by Section 3 of switch 26, depending upon the output condition of flip-flop 38. The binary outputs of counter 380 are connected via lines 390, 392, 394 and 396 to the bases and emitters of transistors 400, 402, 404, 406, 408, 410, 412 and 414 as shown. The collector of transistor 360 is also connected to the base of transistor 412 and the collectors of transistors 362, 364 and 366 are similarly connected to the bases of transistors 408, 404 and 400 such that a high signal can be produced on output line 420 only when the count in counter 380, as manifested by the pattern of high and low signals applied to lines 390, 392, 394 and 396, matches the pattern of high and low signals on lines 368, 370, 372 and 374.

For example, if line 374 is high and line 396 low, transistor 400 is conductive coupling the low voltage on line 396 to line 420 so that a voltage drop of 5 volts results across resistor 421 and point 422 is at ground. Similarly, when line 374 is low and line 396 high transistor 402 is conductive and couples the low voltage on line 374 to line 420, while transistor 402 remains non-conductive. However, when both lines 396 and 374 are high or low neither transistor 400 or 402 is conductive and neither couple a low voltage to line 420. Transistors 404, 406, 408, 410, 412 and 414 operate similarly so that when the count in counter 380 matches that set on Section 3 of switch 26 or 28, none are conductive and line 420 is at a high voltage because there is no voltage drop across resistor 421.

Thus, when the composite counter comprised of counters 316, 318, 320 and 322 produces a given number of successive output signals which is equal to the number programmed into counter 380 by lines 352, 354, 356 and 358 an output signal is produced on line 420 in the form of a high signal. Line 420 is connected to point 422 by diode 424 and the output of a conventional JK flip-flop 426, operating in the "Set-Reset" mode, is also connected to point 422 via diode 428 and line 432 so that for the high signal on line 422 to pass through diode 424 and drive transistor 430 from its normally non-conductive to its normally conductive position, the output of flip-flop 426 on line 432 must likewise be high. However, as will be apparent from the discussion below, the first time that counter 380 produces its output signal on line 420, the output of flip-flop 426 on line 432 will be low so that the output produced on line 420 has no effect on transistor 430. However, when counter 380 has counted a complete decade, a set signal is provided on line 384 which causes flip-flop 426 to shift from its first output condition to its second condition and provide a high signal on line 432. Thus, the second time that the count is reached in counter 380 and a high signal provided on output line 420, that signal causes transistor 430 to shift from its normally non-conductive to its normally conductive condition. This shift causes transistor 440 likewise to shift from its normally conductive to non-conductive condition and apply a positive voltage to counter 442, shown in FIG. 3F, on line 444, counter 442 comprising part of X counter 50. The signal produced on line 444 is also inverted by transistor 448 to apply a reset signal to flip-flop 426 so that flip-flop 426 shifts back to its first condition applying a low signal on line 432. The signal on line 444 is also applied to counter 380 on line 446 in order to reset that counter to zero.

For an example of circuit operation, assume Sections 1, 2 and 3 of the space length set switch 28 is in the 0, 4, 0 position, respectively. Assume further that flip-flop 38 is in its first condition providing a high signal on line 48, which enables the space length set switch 28 and reset amplifier transistor 326. Further consider the output as a pulse train with given period lengths called I.

The internal multi-vibrator clock 20 feeds into the input of counter 316, pin 14. Assume that all the circuits have been reset. This means all counters are in the "zero" state, and the output of flip-flop 426 is low. The internal multi-vibrator clock 20 (200 Khz) will cause the binary outputs of the 16 bit counter comprised of counters 316, 318, 320 and 322 to change in accordance with the accumulated input count. With the switch setting given in the example, Section 2 will cause a momentary negative pulse to be fed through capacitor 331 and diode 334 to the base of transistor 326 when pin 11 on counter 318 changes from a high to a low. This change occurs after the counter has accumulated 16 input counts. The negative pulse causes transistor 326 to momentarily turn off, causing a momentary high on the reset line 329. This pulse resets the 16 bit counter back to zero, and the process repeats.

The reset pulse is also fed to the input of decade counter 380. Counter 380 counts through one complete decade when ten of the above reset pulses occur. When the counts change from state 9 to state 0, flip-flop 426 receives a set pulse which causes it to switch from a low to a high output on line 432. The zero condition of Section 3 of switch 28 is matched by the counter 380 as it switches to the "zero" state; therefore, it causes a high to be on the cathode of diode 424. Since both cathodes of diodes 424 and 428 are high, transistor 430 conducts and causes a momentary negative pulse to be fed to the base of transistor 440, which momentarily turns off, and causes a momentary positive pulse to be fed to the driver output. Further this output provides a reset pulse back to counter 380 and flip-flop 426 and the cycle is repeated.

If we label the periods of the internal multi-vibrator as $I_1$ and the periods of the length set divider output as I, it can be noticed that it took 16 of the internal multi-vibrator pulses to generate one pulse to the input of the decade counter 380. Decade counter 380 had to count through ten counts before one output could be generated on transistor 440. Hence, the period of the out pulse = 160 × period of the internal multi-vibrator, or I = 160I.

It can also be seen that the maximum output frequency of the divider output will be when Sections 1, 2 and 3 of the LENGTH SET switches 26 and 28 are in the O position. In this case the output period is equal to 10 times the internal multi-vibrator period, or $I = 10I_1$.

Each position of Section 3 will add 10% to the output period I starting from the O position of Section 3. For example, note in the above example that the switches were set at 0, 4, 0 to give $I = 160I_1$. Now change the switch setting to 0, 4, 1 for Sections 1, 2 and 3 respectively, and note that it takes 11 counts into decade counter 380 to produce a reset pulse because 10 counts are needed to generate a Set pulse to cause flip-flop 426 to become high; one more count is then needed to cause the decade counter to reach the 1 state in the next decade to match the 1 switch setting. Now a reset pulse will be generated such that $I = 160I_1 + 16_1 = 1761I_1$.

It couls also be shown that a 0, 4, 2 setting of the LENGTH SET switches 26 and 28 would generate a reset pulse such that $I = 160I_1 + 32I_1 = 192I_1$. Now it can be understood that Section 3 of the length set switches 26 and 28 always add 10 percent length to the period I for each successive position from 0 to 9.

Section 2 can be traced to show that from position 1 through position 11, the period I is doubled with each successive switch position. This doubling action can be continued past position 11 of Section 2 by using position 1 through position 5 of Section 1. Detailed explanation is similar to the 0, 4, 0 example given and will show that a maximum I can be obtained by position 5, 0, 9 for Sections 1, 2, and 3 respectively, to give $I = 1,245,180I_1$. Likewise, 0, 0, 0 position will give the minimum $I = 10I_1$. Thus I can be varied from the minimum length to 124, 518 times the minimum length in 10 percent incremental increased by using Sections 1, 2 and 3 of the LENGTH SET switches 26 and 28.

FIG. 3B also illustrates a conventional 5 volt, 1 Amp power supply 443 which is connected as indicated to all of the places in FIG. 3 where 5 volts is required. A switch 445 is provided for turning off the power to all of these circuits.

Figure 3F:
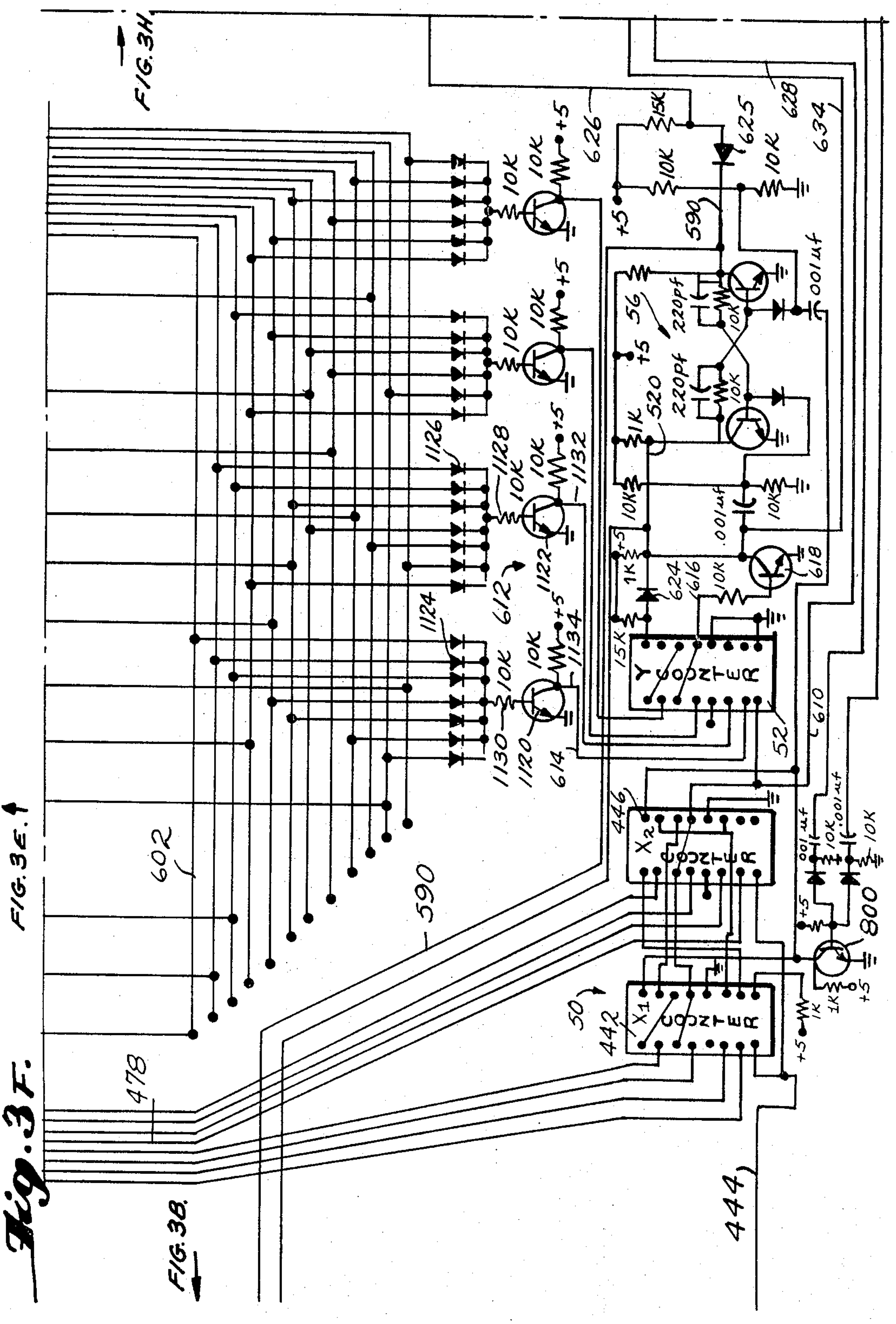

The output of programmable frequency divider 22 on line 444 is applied to frequency divider 50, which is comprised of two individual counters 442 and 446 which have their inputs connected to line 444 as shown in FIG. 3F for receiving the successive pulses from divider 22. Counters 442 and 446 are programmed by the X section of switch 45, or the X section of switch 46, depending upon the output condition of flip-flop 38. When flip-flop 38 is in its first output condition such that a space is being produced, the high signal on line 48 is coupled to arm 450 of the Section 1 of space switch 45, shown in FIG. 3A via diode 452 and then to the line to which that arm is connected. Similarly, the X section of switch 46 is connected to line 44 via diode 454 such that a high signal is applied to arm 456 whenever the flip-flop is in its second output condition so as to cause a slub to be produced. As shown, the X section of switches 45 and 46 are both connected to the same binary lines.

As discussed briefly above, X counter 50 is capable of being programmed in both a primary and secondary mode. In the primary mode, X counter 50 counts the same number of counts from programmable frequency divider 22, both until the signal representing the minimum slub or space length is produced and thereafter. In a secondary mode the program is changed after the minimum signal is produced in order to increase flexibility and permit the system to produce minimum lengths which are relatively long and at the same time maximum to minimum ratios which are small. As will be apparent from the discussion below, if the X section of switch 45 or 46 is set in the zero position, the Y section must be set in any position between 0 and 11 and in this combination the circuitry operates in the primary mode. Conversely, if the X section of the ratio switches 45 or 46 is set in any position 1–11, the Y section must be set in the zero position and in this setting it operates in the secondary mode.

When the X section, for example, of switch 45 is set at the zero position, arm 450 connects to line 458 and, when line 48 is at a high voltage, this high voltage is applied to the base of transistor 460, shown in FIG. 3B, via resistor 462 so that transistor 460 is driven into its conductive region and applies a low signal, essentially at ground, to line 470 which is connected to the emitters of the ten transistors generally indicated at 472, which each have its base connected to a different one of the lines indicated generally at 474. Lines 474 connects, as shown in FIG. 3A, to the X section of switches 45 and 46 so that each position of arms 450 and 456 connects to a different one of lines 474. When the X section of switch 45, for example, is in one of the positions 1-11 and line 470 is essentially at ground, the associated transistor is rendered conductive and applies a low voltage to a combination of the eight program lines generally indicated at 478 which are in turn connected to the inputs of counters 442 and 446 as shown to apply a program to those counters so that those counters produce an output upon a given count as determined by the binary number fixed by lines 478.

Similarly, the Y section of switches 45 and 46 is similarly connected to lines 48 and 44 by diodes 490 and 492, respectively, with each of the positions of the Y sections of switches 45 and 46 being connected to one of the binary lines generally indicated as 494 in the same fashion as the X section of switches 45 and 46. The transistors generally indicated at 496 are each connected to lines 494 by a diode and, when driven into their conductive states different combinations of the transistors 496 and different ones of the transistors 496 similarly impose a program on lines 478 which is applied to counters 442 and 446.

When the X section of switch 45 is in its zero position, as mentioned above, a low signal essentially equal to ground is applied to the emitters of the transistors designated 472. The Y section of switch 45 or 46 will accordingly be in position 1–11 so that the transistors indicated generally as 496, with the exception of transistor 500, will apply a pattern of highs and lows to lines 478 so as to program counters 442 and 446. Since, in this mode of operation, the circuitry is unresponsive to the condition of Y flip-flop 56, this is the primary mode and the program does not change with the shift of Y flip-flop 56. For example, if arm 502 of the Y section of switch 45 is connected to line 504, which is one of lines 494 and which represents position 11, a high voltage is applied via diode 506 to the base of transistor 508 which is one of the transistors 496. Transistor 508 is thus rendered conductive, placing a ground on line 510 which in turn applies a ground signal to line 512 while the remainder of lines 478 remain high and this is a program for counters 442 and 446.

Conversely, if the X section of switch 45 or 46 is in position 1–11 and the Y section in the zero position, the circuitry operates in the secondary mode. When Y flip-flop 56 is in its initial condition prior to receiving a signal from Y programmable divider 52, line 590 is at a high voltage and this voltage is applied to the base of transistor 592 as shown in FIG. 3B via resistor 596 so that transistor 592 becomes conductive and applies ground to line 598. This in effect applies a ground to the emitter of transistor 500 which applies a first program to counter 442 and 446. This unique program will remain on counters 442 and 444 until flip-flop 56 shifts to its second state.

When flip-flop 56 shifts to its other condition so that a low signal is applied at line 590, transistor 592 resumes its non-conductive condition. At the same time line 520 shifts to a high voltage, thus applying a high voltage to the base of transistor 522 via resistor 524 so that transistor 520 is driven into its conductive region, applying a low voltage to line 470 which is connected to the emitter of transistor labeled generally as 472. For example, if the X section of switch 44 is in position 8 connector to line 460, a high voltage is applied to line 464 and that voltage in turn is applied to the base of transistor 476, which becomes conductive and grounds lines 480 and 482 to which the collector of transistor 476 is connected by diodes 484 and 486. This imposes a unique combination of highs and lows on line 478 in the manner described above.

The output of counter 446 on line 610 is applied as the input to Y frequency divider 52, which is programmed by the Y section of switches 45 and 46. A high voltage on each one of the lines 494 causes a different combination of the transistors generally indicated as 612 to be conductive and to apply a different combination of highs and lows on the four input lines generally indicated as 614 to divider 52 and thus Y divider 52 is programmed according to the position of the Y section of switch 45 or 46.

The output of Y divider 52 on line 616 is applied to the base of the transistor 618, which services to invert the signal and apply a pulse to conventional Y flip-flop 56, which shifts from its first output condition with a high signal on 590 and a low signal on line 520 to its second condition with a low signal on line 590 and a high signal on line 520. The low signal on line 520 is passed to the reset input of Y counter 52 via diode 624 so that Y counter 52 is both enabled and reset. Similarly, the shift from high to low of line 590 which is connected via diode 625 to input line 626 of Z counter 54, shown in FIG. 3H, enables that counter, which is connected as shown via line 628 to the output of counter 446 so that Z counter 54 begins counting pulses. As discussed above, divider 54 is programmed by the Z section of switches 45 and 46.

Figures 3G, 4:
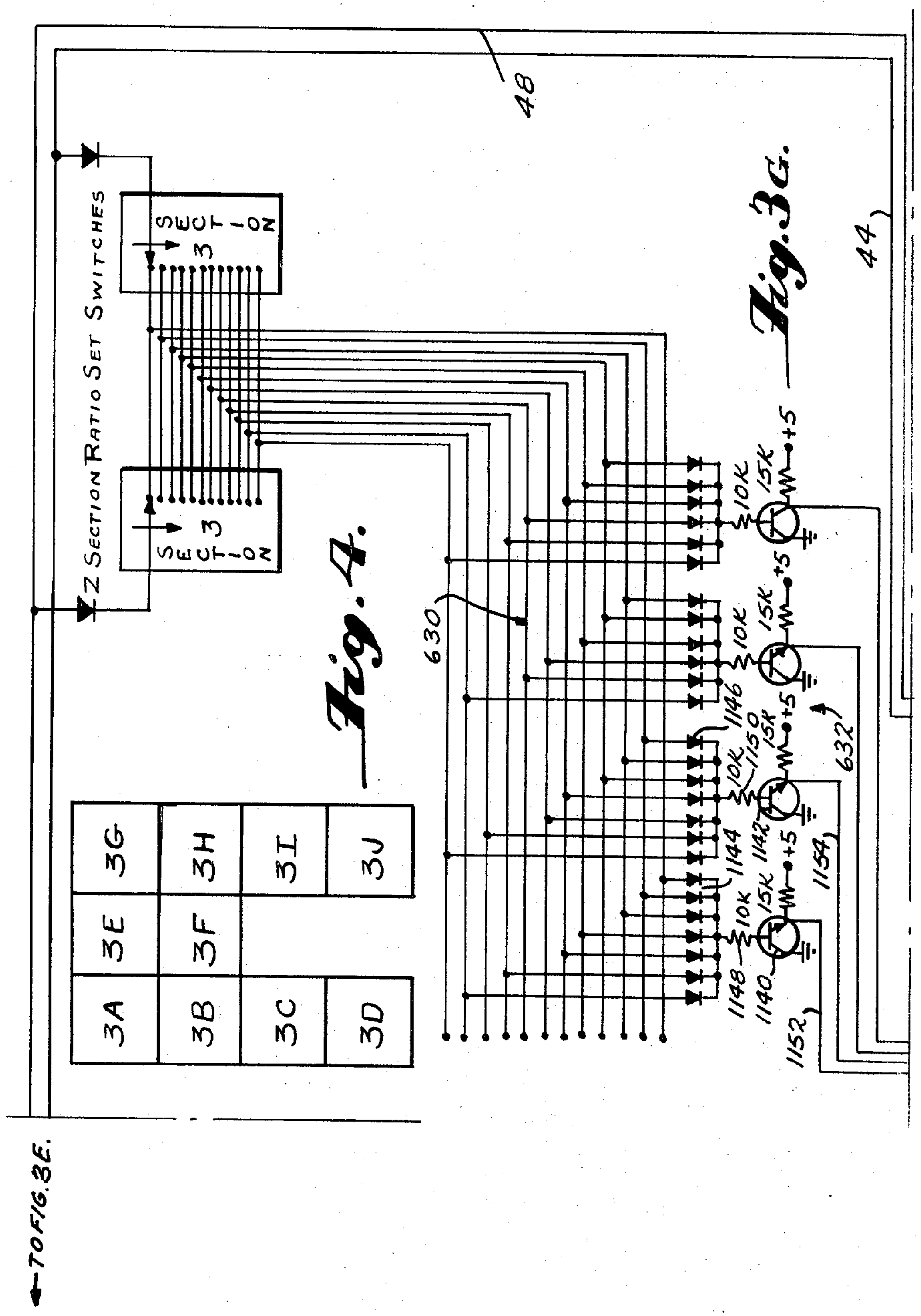
FIG. 4 shows a block diagram of the manner in which the various sheets comprising FIGS. 3A to 3J fit together to form the complete schematic.

The Z section of switches 45 and 46 generates and applies the program signal to divider 54 in the same manner as the Y section applies its program signal to divider 52, with the diodes generally indicated as 630 shown in FIG. 3G applying a unique pattern of highs and lows to the transistors generally indicated as 632 so that that pattern is transmitted to the inputs to divider 54 on lines 675.

Figure 3H:
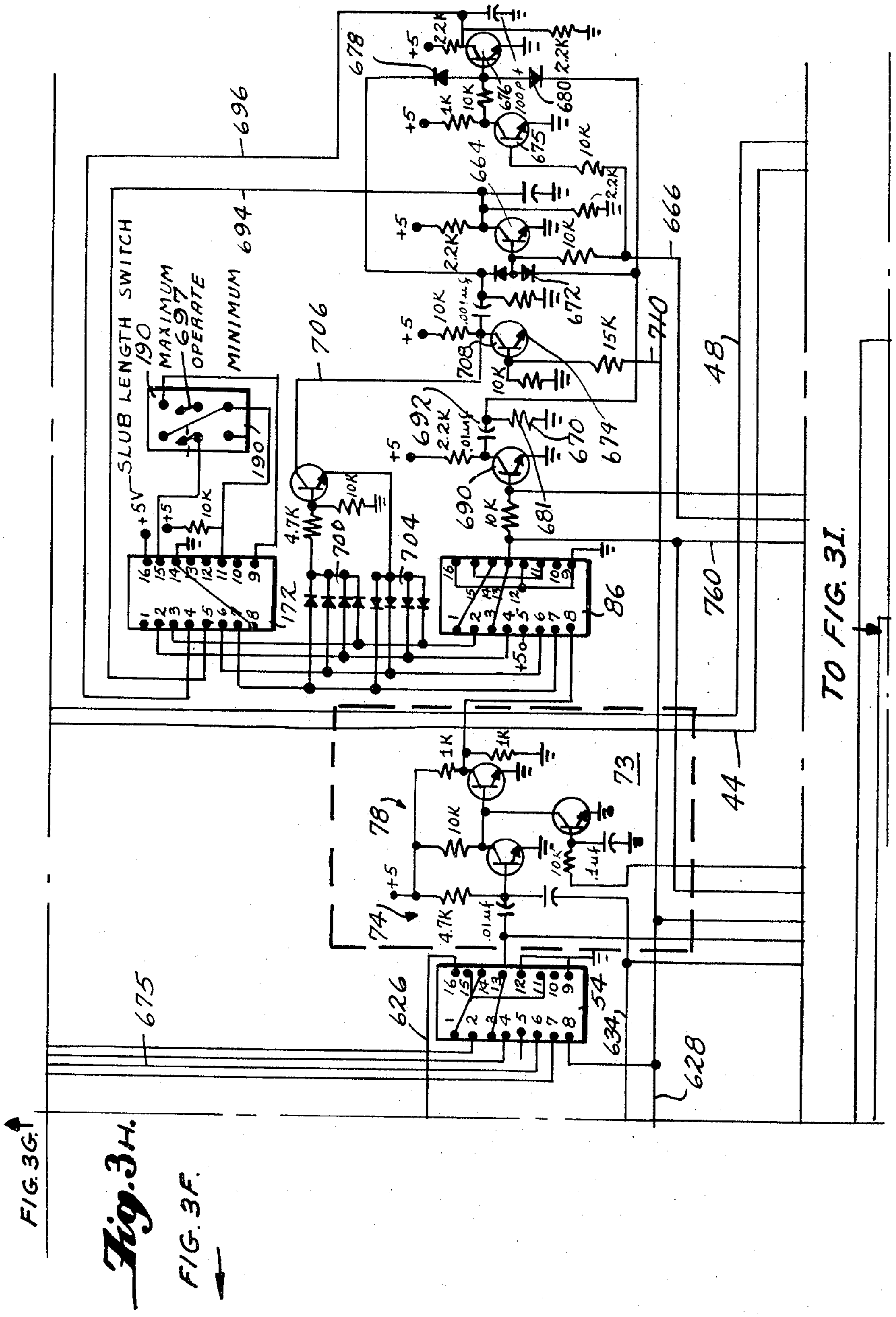

The inverted output of Y divider 52 is also passed on line 634 to the input of the logic 73 comprising OR gate 74 and AND gate 78 as shown in FIG. 3H and the output of flip-flop 38 is also connected to that logic in the fashion shown in FIG. 2 so that, when a space is being produced, the output of Y divider 52 is applied to frequency divider 86. Similarly, when a slub is being produced and flip-flop 38 is in the logical output condition corresponding to that, logic 79, shown in FIG. 3I, which is comprised of OR gate 76 and AND gate 80 passes the output signals from Y divider 54 to frequency divider 84 which, in the same fashion as frequency divider 86, responds to that input by changing its output from a low to a high level. Thereafter, upon receipt of a given number of counts as determined by the program imposed by binary up-down counter 172 or 192, the respective divider 86 or 84 reduces its output from a high to a low which in effect operates to shift the output condition of flip-flop 38 and reprogram divider 84 or 86 as will be described below.

Thereafter, the output signals from Z divider 54 are likewise transmitted through logic 73 or 79, depending upon the output condition of flip-flop 38, and applied to frequency divider 86 when a space is being produced and frequency divider 84 when a slub is being produced. When the number of pulses received by divider 86, after it has been knocked up to its high condition, is equal to the number programmed on binary lines 650, as will be discussed herefter, the output of frequency divider 86 shifts from its high to its low value. This produces a clock pulse which is applied to input 652 of a dynamic shift register comprised of individual registers 654 and 656, shown in FIG. 3I which are serially connected as shown with the output of register 656 essentially connected to the input of register 654. Upon receipt of this clock pulse, registers 654 and 656 go through a complete shift cycle and the output of this shift cycle is applied to an integrator circuit 164 which is comprised of diode 658, resistor 660 and capacitor 662.

The output of integrator circuit 164 is in turn connected to the base of transistor 664, shown in FIG. 3H, via line 666. The base of transistor 664 is also connected to ground via diode 668 and resistor 674 as well as diode 672 and resistor 670 such that the voltage applied to the base of transistor 664 is a function of the integrator output. Below a predetermined output level from integrator 164, transistor 664 is nonconductive. The output of the integrator circuit 164 is also applied through an inverter, including transistor 675, to the base of transistor 676, to which is connected diodes 678 and 680 as shown. Thus, when the output of integrator 164 is below a certain level, transistor 664 will be non-conductive and transistor 676 conductive and, conversely, when it is above that level, transistor 676 will be non-conductive and transistor 664 conductive.

When divider 86 is driven from its low to its high condition upon receipt of a signal from Y divider 52, the inverter including transistor 690 and the differentiating circuit comprised of resistor 674 and capacitor 692 produces a negative pulse which is applied both to the bases of transistors 664 and 676. This negative pulse, of course, has no effect upon the transistor which is non-conductive but causes the transistor which is conductive to be driven into its non-conductive region and accordingly a high pulse to be applied to either the up or down line 694 or 696 respectively, which are connected to the collectors of transistors 664 and 676. If transistor 664 is in its conductive state, this negative pulse, applied via diode 668 causes a positive pulse to be applied to line 694 which causes counter 172 to increase the count therein by one. Similarly, if transistor 676 is conductive and transistor 664 non-conductive, the negative pulse applied by diode 680 causes a positive pulse to be applied to line 696 which is transmitted to the down input to counter 172 to cause the count therein to decrease by one.

When divider 86 is reduced from its high to its low voltage upon the matching of the programmed count with the count in divider 86, a positive pulse is produced by the inverter including transistor 690 and the differentiating circuit comprised of capacitors 692 and resistor 670, but this voltage is blocked by diodes 672 and 680 and has no effect upon the conductive or nonconductive conditions of transistors 664 and 676. Since binary counter 86 receives and accepts its program signal only when the output of divider 86 is low, the new program thus produced does not affect the count in divider 86 which commences when the output of that divider is shifted from its low to its high condition but is the new program which is accepted after the count is reached and divider 86 once again returns to its low output condition.

As mentioned briefly above, all logical one outputs on binary lines 650 and all zero outputs are unacceptable and provision is made to cause counter 172 to move out of these undesired states whenever detected. Diodes 700 are connected to lines 650 as shown and provide a high input to the base of transistor 702 whenever any of the lines has a high voltage thereon. Similarly, diodes 704 are connected to line 650 and provide a low voltage to the emitter of transistor 702 whenever any of the lines 650 has a low voltage thereon. Thus, transistor 702 is normally conductive, applying ground to line 706, except when all logical zeros or all logical ones are detected on lines 650. When this condition occurs, transistor 702 becomes nonconductive and the circuit is now responsive to the reception of pulses from X frequency divider 50, the output of which is connected to the base of transistor 708 via line 710. When transistor 702 is in its non-conductive state detecting all zeros or all ones on binary lines 650, each pulse received at the base of transistor 708 on line 710 causes the transistor to become conductive and the differentiating circuit comprised of resistor 670 and capacitor 712 to produce a negative pulse which is applied to the base of transistor 664 via diode 668 and the base of transistor 676 via diode 678 so that the transistor which is conductive, as determined by the output level of integrator 164 above or below the given level, is driven into its nonconductive condition to provide an output pulse on the up or down line depending upon which transistor, 664 or 676, is conductive and accordingly to cause the up-down counter 172 to move out of its forbidden states. Further, because the X counter 50 operates at a frequency which is relatively fast, a number of such pulses will be applied to transistors 664 and 676 to cause a number of up or down counts to be applied to line 694 or 696 respectively before the detecting circuit including transistor 702 causes that transistor to return to its conductive condition. Thus, the counter may be spun through several decades out of the forbidden all zero or all ones conditions.

Figures 3H, 3I, 3J:
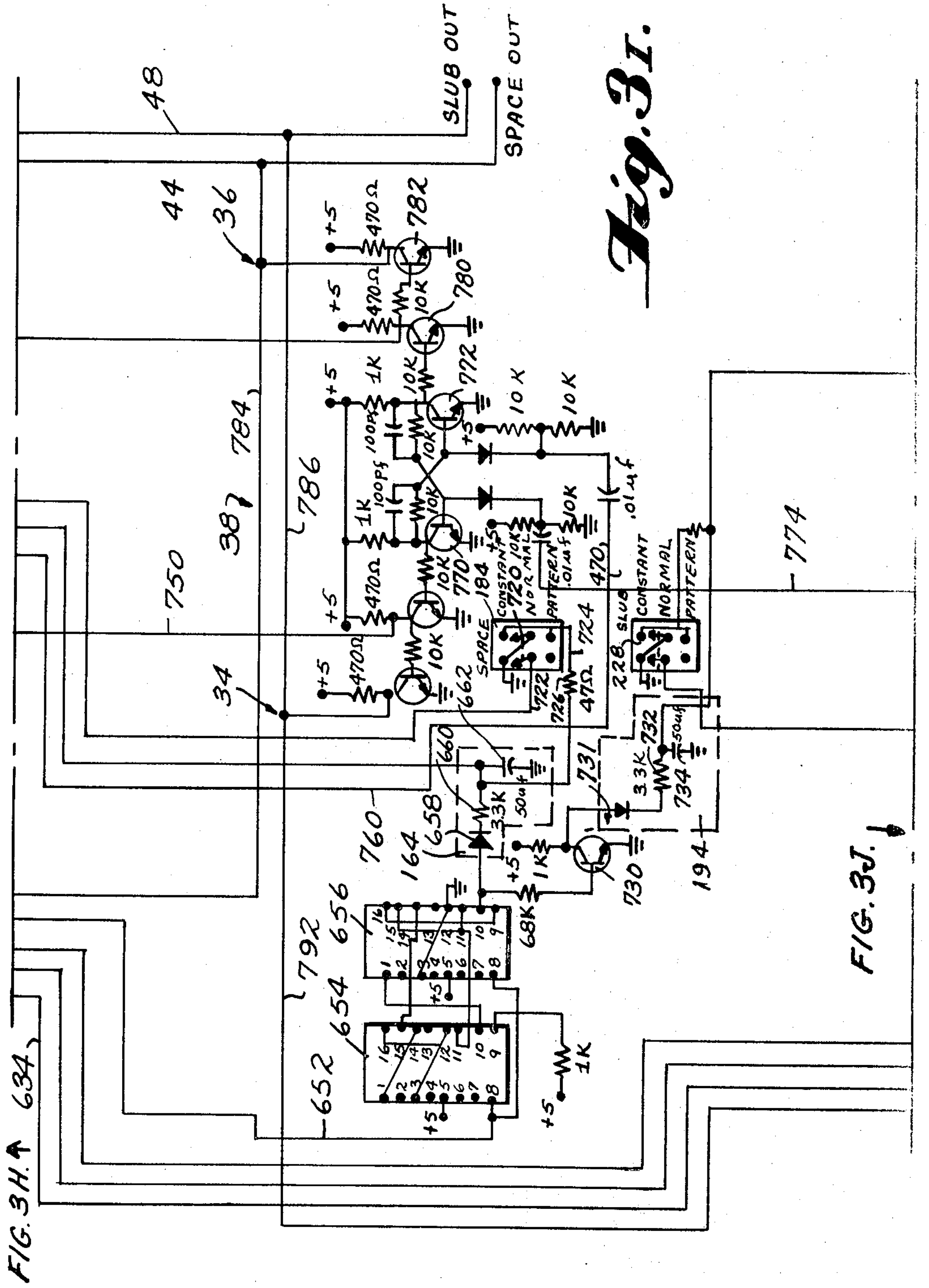
Figure 3J:
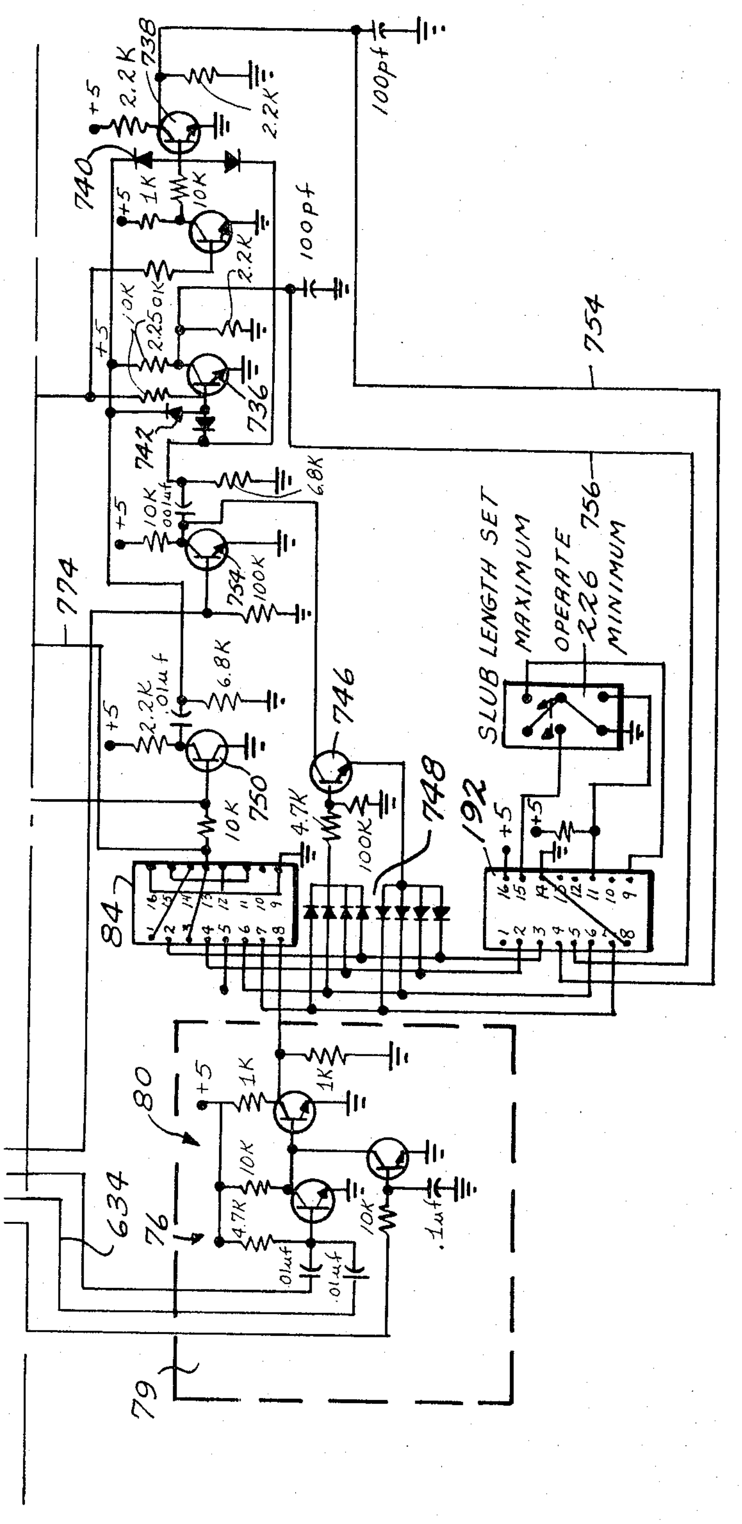

As mentioned briefly above, space ratio switch 184, shown in FIG. 3I is included to permit the circuitry to operate in at least three modes. In the first mode, termed the normal mode, the ganged electrical contact arms 720 are not electrically connected to any of the other contacts so that operation of the circuitry proceeds as described above. In a second position, termed the pattern position, arms 720 electrically connect line 724 to ground. Line 724 is connected via resistor 726 to the point of connection between resistor 660 and capacitor 662 so that the integrating circuit 164 is disabled and a uniform low voltage is applied to the bases of transistors 664 and 676. Thus, transistor 664 will be kept non-conductive and transistor 676 will be kept conductive, regardless of the output of the shift registers 654 and 656, so that each time divider 86 shifts from its low to its high output condition providing a negative pulse, this negative pulse turns off transistor 676 providing a positive pulse on down line 696 which is applied to up-down counter 172 on line 696. The counter thus counts down one for each output of divider 86 and sequentially produces each of the possible programs produced by binary counter 172 so that each of the possible lengths of space separation between adjacent slubs is produced in turn. Of course, since the program numbers from binary 172 do not necessarily match the counts in divider 86, the order of the pattern will not be normally from highest to lowest or lowest to highest.

When space ratio switch 184 is shifted into its third position, termed the constant position, connecting both lines 722 and 724 to ground, the output of integrater circuit 164 is kept at a low voltage and further the base of transistor 690 is kept grounded so that transistor 690 does not respond to the rise of the output of divider 86 from its low to its high voltage. Accordingly, no signals are produced on lines 694 and 696 and the output of up-down counter 172 remains the same so that divider 86 produces its output signal upon the same count repetitively and the space between adjacent slubs remains the same.

Space length mode switch 190, shown in FIG. 3H, can also be employed to cause the circuitry to produce spaces which are the maximum or minimum in the range. In a first position, labelled the maximum position arms 697 of switch 190 connect pin 15 of counter 172 to pin 9 so that counter 172 imposes a program on counter 86 which produces a space of the maximum length permitted. In a second position, the switch has no effect. In the minimum position arms 697 connect pin 15 of counter 172 to pin 11, thus imposing a program which produces a space of the minimum length.

The output of shift registers 654 and 656 is also inverted by a circuit including transistor 730 and applied to a second integrating circuit 194 which is comprised of diode 731, resistor 732 and capacitor 734. The output of integrating circuit 194 is applied to the bases of transistors 736 and 738, shown in FIG. 3J, in the same fashion as discussed above with regard to transistors 664 and 676. The output of divider 84 is connected to the bases of transistors 736 and 738 via diodes 740 and 742 respectively in the same fashion as discussed above. Similarly, transistor 746 is connected to the diodes generally indicated at 748 and is conductive except when an all one or all zero condition is detected on the output of binary counter 192.

The output of divider 84 is inverted by a circuit including transistor 750 and differentiated to apply a negative pulse to the bases of transistors 736 and 738 so that whichever one of these transistos is in its conductive condition because of the output level of the integrating circuit 194 is driven into its non-conductive condition to provide an up or down count on line 754 or 756. Thus, when an all zero or all one condition is detected, a number of pulses are applied to the down input 754 as the pulses from the X divider 50 are produced and applied to the base of transistor 754. Slub ratio switch 228 operates in the same fashion as the space ratio switch 184, and slub length switch 226 operates in the same manner as switch 190, to cause the circuitry associated with the production of slubs to operate in the various modes set forth above with respect to the production of spaces.

The output of divider 86 is also applied on line 760 as one input to a conventional flip-flop 38, as shwon in FIG. 3I, which includes transistors 770 and 772. The other input of flip-flop 38 is connected to the output of divider 84 by line 774. Thus, each time that divider 86 shifts from its high to its low condition, the output of flip-flop 38 similarly shifts. The output of flip-flop 38 is connected to a driver circuit comprising transistors 780 and 782 so that when a slub is being produced and divider 86 shifts from its high to its low condition, flip-flop 38 shifts so that the driver circuitry comprising transistors 780 and 782 provides a high output on line 784 and a low output on line 786. Similarly, when thereafter divider 84 shifts from its high to its low condition while a space is being produced, the output of flip-flop 38 shifts to its other output condition so that the driver circuitry comprising transistors 780 and 782 provides a low output on line 784 and a high output on line 786. These outputs are coupled to the switches 45 and 46 by lines 44 and 48 as discussed as well as to switches 26 and 28 and are also additionally applied to the driver circuitry discussed in detail above to cause the slub and space switches to be operated alternatively to produce slubs and spaces at the desired times. The output of flip-flop 38 on lines 784 and 786 is also applied to the reset inputs of counters 442 and 446 via reset amplifier 800, as discussed above, to reset these counters to their initial zero state.

The following table illustrates a few programs for use with the X section in its zero position. Many other programs and programs for the X section in positions 1–11 will be readily apparent.

DIVIDER PROGRAM TABLE

X Section in Zero Position

| $X_1$ $X_2$ Program On Lines 478 | Divider 50 Frequency | Min. Sp. or Slub Tot. | Y Switch Position | Y Program On Lines 614 | Divider 52 Frequency | Z Switch Position | Divider 54 Frequency | Z Program On Lines 675 |
|---|---|---|---|---|---|---|---|---|
| 0 1 1 1 1 1 1 1 | 255:1 | 511 | 0 | 1 1 1 0 | 2:1 | 0 | 2:1 | 1 1 1 0 |
| 1 1 0 1 0 1 1 1 | 170:1 | 511 | 1 | 1 1 0 0 | 3:1 | 1 | 3:1 | 1 1 0 0 |
| 0 1 0 1 1 0 1 0 | 128:1 | 513 | 2 | 1 0 0 0 | 4:1 | 2 | 4:1 | 1 0 0 0 |
| 0 0 0 0 1 1 0 0 | 102:1 | 511 | 3 | 0 0 0 1 | 5:1 | 3 | 5:1 | 0 0 0 1 |
| 1 0 1 0 1 0 0 0 | 85:1 | 511 | 4 | 0 0 1 0 | 6:1 | 4 | 6:1 | 0 0 1 0 |
| 1 1 1 1 1 0 0 1 | 73:1 | 512 | 5 | 0 1 0 0 | 7:1 | 5 | 7:1 | 0 1 0 0 |
| 0 1 0 1 0 0 0 0 | 64:1 | 513 | 6 | 1 0 0 1 | 8:1 | 6 | 8:1 | 1 0 0 1 |
| 0 0 0 1 0 0 0 0 | 57:1 | 514 | 7 | 0 0 1 1 | 9:1 | 7 | 9:1 | 0 0 1 1 |
| 0 1 1 1 1 0 0 0 | 51:1 | 511 | 8 | 0 1 1 0 | 10:1 | 8 | 10:1 | 0 1 1 0 |
| 0 1 1 0 0 0 1 1 | 46:1 | 507 | 9 | 1 1 0 1 | 10:1 | 9 | 11:1 | 1 1 0 1 |
| 1 0 0 0 1 1 0 0 | 43:1 | 517 | 10 | 1 0 1 0 | 12:1 | 10 | 12:1 | 1 0 1 0 |
| 1 0 0 0 1 0 0 0 | 39:1 | 508 | 11 | 0 1 0 1 | 13:1 | 11 | 13:1 | 0 1 0 1 |

PARTIAL RATIO TABLE
FOR SWITCHES 45 and 46

| RATIO | SECTION 1 | SECTION 2 | SECTION 3 | RATIO | SECTION 1 | SECTION 2 | SECTION 3 |
|---|---|---|---|---|---|---|---|
| 1.1 | 1 | 0 | 0 | 13 | 0 | 10 | 9 |
| 1.2 | 2 | 0 | 0 | 14 | 0 | 1 | 1 |
| 1.4 | 3 | 0 | 0 | 15 | 0 | 10 | 11 |
| 1.6 | 4 | 0 | 0 | 16 | 0 | 4 | 5 |
| 1.8 | 5 | 0 | 0 | 17 | 0 | 2 | 3 |
| 2.0 | 6 | 0 | 0 | 18 | 0 | 4 | 6 |
| 2.2 | 7 | 0 | 0 | 19 | 0 | 3 | 5 |
| 2.4 | 8 | 0 | 0 | 20 | 0 | 4 | 7 |
| 2.6 | 9 | 0 | 0 | 21 | 0 | 5 | 9 |
| 2.8 | 10 | 0 | 0 | 22 | 0 | 6 | 11 |
| 3.0 | 11 | 0 | 0 | 23 | 0 | 5 | 10 |
| 3.5 | 0 | 8 | 0 | 24 | 0 | 3 | 7 |
| 4.0 | 0 | 11 | 1 | 25 | 0 | 5 | 11 |
| 4.5 | 0 | 9 | 1 | 27 | 0 | 1 | 4 |
| 5.0 | 0 | 11 | 2 | 29 | 0 | 3 | 9 |
| 5.5 | 0 | 10 | 2 | 30 | 0 | 2 | 7 |
| 6.0 | 0 | 11 | 3 | 32 | 0 | 3 | 10 |
| 6.5 | 0 | 5 | 1 | 33.5 | 0 | 2 | 8 |
| 7.0 | 0 | 9 | 3 | 34.5 | 0 | 3 | 11 |
| 7.5 | 0 | 2 | 0 | 35.5 | 0 | 1 | 6 |
| 8.0 | 0 | 11 | 5 | 37.00 | 0 | 2 | 9 |
| 8.5 | 0 | 10 | 5 | 40.00 | 0 | 1 | 7 |
| 9.0 | 0 | 6 | 3 | 45.00 | 0 | 1 | 8 |
| 9.5 | 0 | 4 | 2 | 48.00 | 0 | 1 | 9 |
| 10.0 | 0 | 8 | 5 | 53.00 | 0 | 1 | 10 |
| 10.5 | 0 | 9 | 6 | 57.5 | 0 | 1 | 11 |
| 11.0 | 0 | 11 | 8 | 60.0 | 0 | 0 | 7 |
| 11.5 | 0 | 8 | 6 | 66.00 | 0 | 0 | 8 |
| 12.0 | 0 | 5 | 4 | 72.5 | 0 | 0 | 9 |
| 12.5 | 0 | 7 | 6 | 79.0 | 0 | 0 | 10 |
| | | | | 85.5 | 0 | 0 | 11 |

A specific example will now be given to make the operation of the circuitry shown in FIG. 3 even clearer. Assume it is required to produce a slub yarn on a spinning frame in which the spacing between adjacent slubs will vary from 1 inch to 14 inches, and the slub length will vary from 1 inch to 3 inches. The variation of spacing and slub lengths are to be randomly dispersed. Assume also that the spinning frame is set up with proper gearing and speeds such that operation of a single electric clutch will produce a suitable slub in the yarn when engaged and will produce staight yarn when disengaged. The space and slub ratios can be calculated from above:

Space ratio=14 inches divided by 1 inch =14 to 1;

Slub ratio =3 inches divided by 1 inch=3 to 1. Power is applied to the electronic slub unit and the spinning frame is operating.

With the above information the front panel controls shown in FIG. 1 are set as follows: Under "Space Program " set Sections 1, 2 and 3 of the ratio set switch 45 as per the above Partial Ratio Table to effect a 14 to 1 ratio. Likewise, under "Slub Program" set ratio set switch 46 for a 3 to 1 ratio as per above Partial Ratio Table. Place both length set mode switches 190 and 226 under the Space and Slub Programs to the minimum positions. Adjust length set switch 26 under "Slub Program" for approximately a 1 inch slub length. Likewise, adjust length set switch 28 under "Space Program" for a 1 inch space between adjacent slubs. Move each of the length set mode switches 26 and 28 to the "Maximum" position as a check to see if the space length is 14 inches and the slub length is 3 inches. The unit is now calibrated with the speed of the spinning frame to produce space lengths between adjacent slubs from 1 inch to 14 inches and the slub size will vary from 1 inch to 3 inches. Place the length set mode switches 26 and 28 under space and slub program to the operate position. Place the ratio set mode switches 184 and 228 under Space and Slub Program to the "Normal" position. Now the Space length and Slub lengths will vary from their minimum to maximum lengths in 14 different discrete lengths. The order in which the lengths appear will be a pseudo-random pattern controlled by the internal psuedo-random generator. If it is desired to view each of the 14 incremental lengths between the minimum and maximum lengths then place the ratio set mode switches 184 and 228 in the pattern position. This will disengage the pseudo-random generator and cause the output to vary from the minimum length through each discrete length including the maximum then back to the minimum. This pattern is repeated every 14 lengths. If the spinning frame is equipped with a tachometer type device comparable with the external clock input, then once the slub unit is calibrated at a particular machine speed the output pattern will remain calibrated as machine speed varies. Due to the similarity of the slub program circuits to the space program circuits only the space program circuits will be used as an example to show detail circuit operation with the understanding identical action will occur during the slub production.

Note that a Space Ratio greater than 3 to 1 was chosen which utilizes only the Primary program. This was done in this example to simplify operation. Refer now to FIG. 3 to trace the operation of the circuit with a 14 to 1 Space Ratio program and the space length set mode switch set in the "Minimum" position.

Note on the Ratio charge given above that the X, Y and Z sections of the space ratio set switch 45 are set to positions 0, 1, and 1 respectively. The 0 position of the X section feeds positive voltage to the bases of transistors 460 and 592. This grounds the common line for the emitters of the Primary and Secondary program transistors which are connected to the collectors of transistors 460 and 592. The 1 position of section Y provides a Primary program for X frequency divider 50 by feeding positive voltage to the base of transistor 1100 through diode 1102 and resistor 1104. This causes program lines 1108 and 1100 for the X frequency divider 50 to become low through the "on" state of transistor 1100 as applied via diodes 1112 and 1116. This program causes X frequency divider 50 to be a 170 to 1 frequency divider.

The 1 position of the Y section provides a positive voltage to the bases of transistors 1120 and 1122 through diodes 1129 and 1126, and resistors 1128 and 1130. This causes a low on program lines 1132 and 1134 for Y frequency divider 52. This causes Y frequency to divider 52 to become a 3 to 1 frequency divider. The 1 position of the Z section 3 of the space ratio switch 45 provides positive voltage to transistors 1140 and 1142 through diodes 1144 and 1146 and resistors 1148 and 1150. This causes a low on program lines 1152 and 1154 of Z frequency divider 54 which makes it operate as a 3 to 1 frequency divider.

Note that when space length mode switch 190 is set in the Minimum position it disables counter 172 and causes it to hold in the 7 binary state. This binary state is wired to program lines 650 of frequency divider 86. The 7 binary state makes divider 86 operate as a 2 to 1 frequency divider. For clarity the operating characteristics of the frequency divider in the circuit is reviewed.

If the reset (pin 16) of frequency divider 86 is high the divider is disabled and the output (pin 13) is also high. Once the reset pin is brought low to enable the divider, the output will remain high until the next trailing edge of the input pulse occurs, then the output will switch low and divider 86 will be in the zero position. The output will stay low until the $n$-1 pulse occurs, then will switch high. When the trailing edge of the $n^{th}$ pulse occurs the output will again switch low to the zero state. For an example of this operation assume a divider such as this circuit utilizes is programmed to operate as a 5 to 1 frequency divider. Assume further that the divider output is low, in the zero state, and a pulse train is fed into the input. Upon the trailing edge of the fourth pulse the divider output will go high and then on the output of the fifth pulse it will go low, hence a 5 to 1 frequency divider. As long as the pulse train is fed into the input, the output of the divider will switch from high to low on the trailing edge of every five pulses. A divider "output" is defined as the condition when its output switches from a high to a low.

If, in the above example, the reset pin had been high and switched to low prior to starting the pulse train into the input, it would have required one pulse to switch the divider into the zero state, then it operates as a 5 to 1 frequency divider. The binary program on the input program lines of a divider is read into the divider only when the output is high and the input is receiving an input pulse.

With the above panel settings, X frequency divider 50 is programmed to operate as a 170 to 1 divider, Y divider 52 as a 3 to 1 divider, a Z divider as a 3 to 1 divider, and divider 86 as a 2 to 1 divider. It will be shown by tracing the signal path on FIG. 3 that the Space output length will be 511 input pulses.

We now trace the input I through the divider. It takes one input pulse to bring the output of X divider 50 to the zero state because of the previous reset pulse. This causes one output to be generated on pin 13 of counter 446 into the input of Y frequency divider 52. Then after 170 input pulses occur to the X frequency divider 50, another output is generated, and so on every 170 input pulses. The Y frequency divider 52 reset was brought low previously by the Y flip-flop 56 reset; therefore, it takes one output from the X frequency divider 50 to cause the output of Y frequency divider 50 to switch low. Then since the Y frequency divider is a 3 to 1 divider it will take two more pulses from the output to switch from low to high. Note that the output of Y frequency divider is inverted such that the inverter generates an output for the Y frequency divider 50 when the Y frequency divider switches from a low to a high. To this point three pulses total have been fed into the Y frequency divider 52 from the output of the X frequency divider 50. This represents a total of one I pulse on the input of X frequency divider 50 to bring it to the zero state and 2 time 170I input pulses for the 170 to 1 frequency division operation, thus the total is 341I.

The "output" of counter 442 causes a Set pulse to Y flip-flop 56 which causes Y frequency divider 52 reset to be pulled high and the reset pin of the Z frequency divider 54 to be pulled low. This also causes the output of divider 86 to go high since it was already in the zero state, and it is programmed as a 2 to 1 divider. The next input to divider 84 will cause it to generate on output pulse. The X frequency divider 50 output is also fed into the Z frequency divider input 54. Since the reset pin of the Z frequency divider has been pulled low by the Set condition of the Y flip-flop 56 the next output of X divider 50 will cause the output of the Z divider 54 to switch from high to low. The next "output" of X frequency divider 50 will come 170 input pulses after the output of counter 442 because X frequency divider 50 is still programmed as a 170 to 1 frequency divider; therefore, divider 86 will receive the second pulse when Z frequency divider 54 receives the first input from X frequency divider 50. The total input pulses when this occurs is 341I to Set Y flip-flop 56 and then 170I to bring Z output from high to a low which is a total 511I. Therefore, divider 86 will produce an output when this occurs which will cause a Set pulse to be applied to flip-flop 38.

Divider 86 further provides an input into OR gate 174 to provide an up or down count pulse into binary up and down counter 172. If the space length set mode switch 190 and space ratio set mode switch 184 are in the operate and Normal positions respectively then counter 172 will change state which will cause divider 86 to be programmed differently the next time it receives an input pulse. The circuit is designed such that for any ratio setting of either Space or Slub from 1.1 to 1 up to 85 to 1, the minimum Space or Slub will always be approximately 511I.

Now assume that a 1.1 to 1 space ratio is desired which will require a 1, 0, 0 switch setting for Sections 1, 2 and 3 of the space ratio set switches, respectively. As is apparent from the above discussion, X frequency divider 50 is now programmed to be a 255 to 1 frequency divider, and Y frequency divider 52 to be a 2 to 1 frequency divider. The o position of the Z section of the ratio set switch 45 provides a 2 to 1 divider program for divider 54. The first input pulse I into X frequency divider 50 causes its output to switch from high to low since it had previously received a reset pulse. This provides the first input into Y frequency divider 52, which causes the output of Y frequency divider 52 to switch low, which causes the output of inverter 53 to switch from low to high. The Primary program on X frequency divider 50 causes divider 50 to operate as a 255 to 1 divider; therefore, after 255 more inputs I the output of divider 50 will again feed an input into Y frequency divider 52. Since Y frequency divider 52 is also programmed as a 2 to 1 divider then the output of divider 52 will switch from low to high causing inverter 53 to provide a Set pulse to Y flip-flop 56. Note at this point it has taken a total of 256 input pulses into X frequency divider 50.

The Set pulse into Y flip-flop 56 causes Y frequency divider 52 to become disabled and it pulls the reset pin of Z frequency divider 54 low. Further the Set position of Y flip-flop 56 causes the common to the Secondary program to go low which causes X frequency divider 50 to be reprogrammed as a 2 to 1 divider. However, it will take one more cycle through the X divider 50 for it to operate as a 2 to 1 divider because the program lines must be changed while the output pin is high for divider 50 to recognize the new program. After 255 more pulses go through the X frequency divider 50 it feeds the first input into Z frequency divider 54. This causes the Z output to switch from high to low since its reset pin had been pulled low prior to this input. This action feeds an input into divider 86 which is the second input into divider 86, and since divider 86 is programmed as a 2 to 1 frequency divider it causes divider 86 to provide a Set pulse to the flip-flop 38 which ends the space length. With divider 86 programmed into the minimum position, it took 256I + 255I = 511I input pulses to produce the minium Space Output length in the 1.1 to 1 Space ratio program as it did for the 14 to 1 Space ratio program in the previous sample.

It took 256I input pulses to cause flip-flop 56 to receive a Set pulse. This Set pulse also fed the first pulse into frequency divider 86. Also the Set pulse caused the program on the X frequency to change from a 255 to 1 Primary Program to a 2 to 1 Secondary program, but X frequency divider 50 had to receive 255 more pulses after the Set pulse to flip-flop 56 before the Secondary program could be recognized.

The total input before the Secondary program can be recognized is 256I + 255I = 511I. At this point divider 86 received an input from Z divider 54 which is the second input. Since it is programmed as a 15 to 1 divider it needs 13 more pulses before it can provide a Set pulse to the flip-flop 38 which will cause it to end the Space Output length.

Since the X frequency divider 50 recognized the secondary program after 511I it then becomes a 2 to 1 divider; therefore, since Z divider 54 is also a 2 to 1 divider 86 will receive an input from Z divider 54 for every 4I. Hence it will take 13 × 41 = 52I for divider 54 to have an output to provide a Set pulse to the O flip-flop; therefore, the maximum space output length will be 511I + 52I + 563I. Note that 563I divided by 511I equals approximately a 1.1 to 1 ratio.

Figure 5:
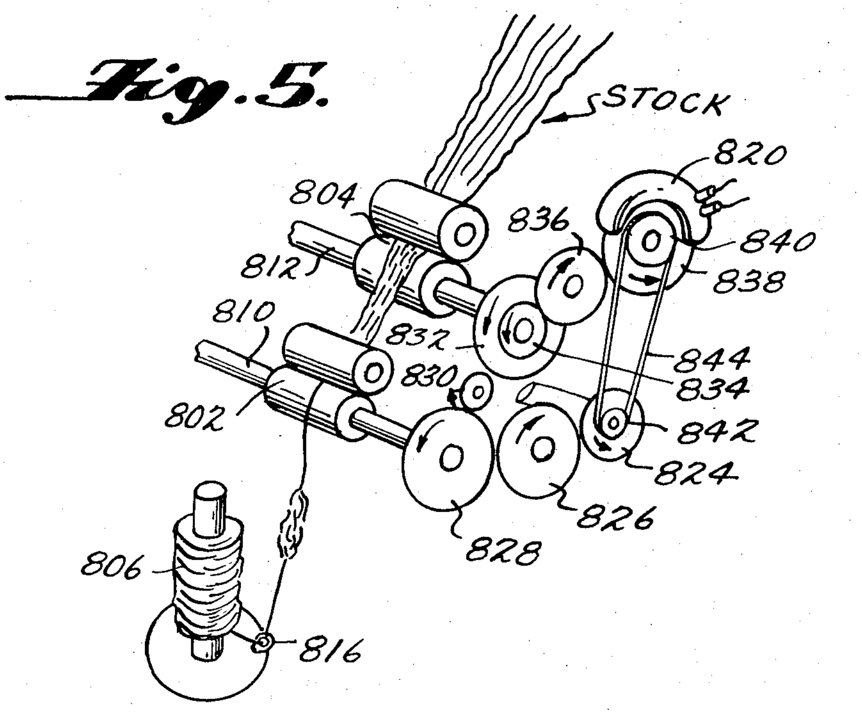
FIG. 5 shows a simplified view of an apparatus for producing slub yarn whereby an electric clutch is energized to produce a slub.

Reference is now made to FIG. 5 which shows a simplified schematic of a typical set up for producing slub yarn on a spinning frame. There are, of course, many alternative ways that this can be done using the output of the circuitry shown in FIGS. 2 and 3, but this arrangement has been found to be particularly advantageous. Also, while a typical spinning frame will have many sets of rollers such as roller sets 802 and 804, only two such rollers are shown for simplicity in illustration and it will be readily appreciated how the rest are employed.

The weight and size of the yarn which is wound on conventional spindle 806 is of course determined by a number of factors, including the amount of twist of the yarn, the stock characteristics thereof, the draft, etc. In the discussion below, it is assumed that all of these variations except the draft are held constant.

Draft is a function of the speed difference between shaft 810 which drives rollers 802 and shaft 812 which drives rollers 804. This speed difference causes the stock to be stretched or drafted between the set of rollers 804 and the second set of rollers 802. Each set of rollers as shown comprises a driven roller with a further roller which can be mounted as desired and which is not driven. Thus the draft between the set of rollers 804 and the set of rollers 802 determines how much stock is spun per unit length between traveler 816 and set of rollers 802 by the motion of spindle 806.

The size and weight of the spun yarn can be increased if the stock is increased per unit length coming out of the set of rollers 802. This stock can be increased by either slowing down shaft 810 with respect to shaft 812 or by speeding up shaft 812 with respect to shaft 810. In the embodiment shown in FIG. 4, shaft 812 is speeded up with respect to shaft 810 by the use of a conventional electric clutch 820. Both shafts 810 and 812 are driven from a main drive shaft 822, which is conventionally connected to an electric motor (not shown) shaft 810 is driven by shaft 822 through conventional gears 824, 826 and 828.

Shaft 812 has two drive ratio paths with respect to driving shaft 822. One of these paths is through conventional gears 824, 828, 830 and 832 and is the primary path. A secondary path is established through gears 834, 836 adn 838 with the gear 838 being coupled to the main drive shaft 822 through sprockets 840 and 842, chain 844 and electric clutch 820.

The primary drive is always geared to turn shaft 812 slower than the secondary drive. Therefore, provision must be made such that the primary and secondary drives to shaft 812 will not be energized simultaneously. This is accomplished by gears 832 and 834 on shaft 812 which are part of a mechanical overriding clutch mechanism. This overriding clutch is constructed such the gear 834 is coupled to shaft 812 only when it is turning at a greater speed than gear 832. Similarly, gear 832 is coupled to shaft 812 only when it is turning at an equal or greater speed than gear 834.

From the above discussion it should be apparent that energizing electric clutch 820 will cause an immediate increase in the spun yarn size and weight due to the increase of stock per unit length of yarn. The electric clutch is energized normally for short periods to produce enlargements in the spun yarn termed slubs and if cloth is woven from these yarns wherein the space between adjacent slubs and/or slub length is varied between set limits in a random fashion, then the cloth has a very desirable appearance.

Figure 6:
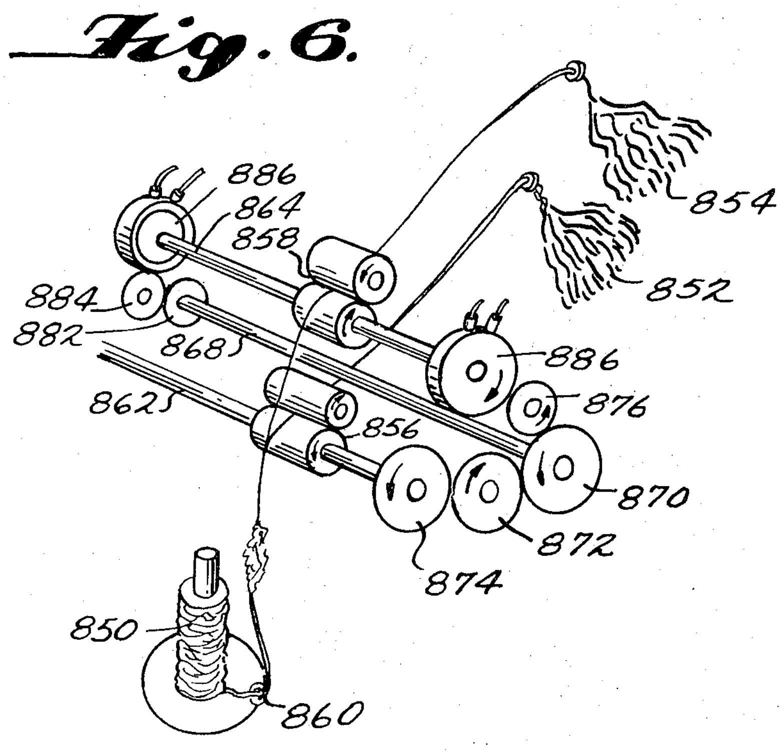
FIG. 6 shows a further simplified apparatus for producing novelty slub thread whereby a first clutch is actuated and a second clutch deactuated to produce a slub and the first clutch deactuated and the second clutch actuated in order to produce a space.

Reference is now made to FIG. 6 which shows a simplified set up for a novelty twister for producing slub yarn. In this arrangement, two or more ends of yarn are twisted and wound upon a spindle 850 with the ends fed from yarn cones 852 and 854 through pressure rollers 856 and 858, respectively. The motion of traveler 860 causes the yarns to be twisted between traveler 860 and rollers 856. Shaft 862 drives rollers 856 and similarly shaft 864 drives rollers 858. As in the above embodiment, shaft 864 has two possible drive paths from the main drive shaft 868. One of these paths is through gears 870 and 876 and clutch 880 while the other path is through gears 882, 884 and electric clutch 886. Thus, clutch 886, when actuated, couples drive shaft 868 to rollers 858 via one gear path and clutch 880 when actuated with clutch 886 deactuated, couples shaft 868 to rollers 858 via a further gear path including gears 870, 876 and 880. Shaft 862 is driven through gears 870, 872 and 874.

As mentioned above, one way of producing slubs is to slow down the speed roller 858 with respect to the other roller 850 such that more of the yarn on cone 852 will wrap around the yarn on cone 854 per unit length. By actuating one of the clutches 886 and 880 and deactuating the other and reversing that condition, alternate slubs and spaces can be produced on the yarn wound on spindle 850.

Accordingly, the above-described circuit shown in detail in FIGS. 3A to 3J has been found to be particularly advantageous for making slub yarns and thread, for example, on the devices described above, without any pattern in the length of spaces and slubs which can be detected after the thread or yarn has been woven into a fabric. In fact, while there is undoubtedly some pattern which is established by this circuitry, that pattern is so long and so complex that it is difficult, if not impossible, to calculate it. While advantageous for this particular purpose, the circuitry shown can also be used to produce alternate pulses for whatever purpose those pulses having a random width between limits which can be readily and quickly established according to the various switches described above.

Reference is now made to FIG. 7 which shows a block diagram of one embodiment of the novel driver circuitry 230 of this invention. As mentioned above, this circuit includes an electronic switch driver 920, which is adapted for receiving at least first and second input signals on line 232 with the first input signal being a high voltage which results when flip-flop 38 is in its second condition and a slub is to be produced and the second input signal being a low voltage when flip-flop 38 is in its first condition and a space is to be produced. When the first input signal is received, driver circuitry 230 produces a suitable signal which is received by electronic switch 922, connected to driver 920 as shown, so that switch 922 applies at least a substantial portion of the voltage of a conventional D. C. voltage source 924 developing for example 150 volts D. C., to terminal A of load 926, which is preferably comprised of a coil 930 of an electric clutch, a solenoid or other similar device, through which current flows to generate a magnetic field and store energy which is then used to accomplish a mechanical function. Coil 930 is connected in series with a variable resistor 932, which exhibits one resistance when current flows through it in a first direction and a different resistance when current flows through it in the opposite direction.

Electronic switch 922 is connected to a second electronic switch 934, as is switch driver 920, so that when switch 922 applies a substantial portion of the voltage provided by source 924 to terminal A in response to the first input signal received by switch driver 920, electronic switch 934 applies a voltage to terminal B which is lower than the voltage applied to terminal A so that current flows through load 926 in the direction indicated by arrow 938. Electronic switch 934 as well as electronic switch 922 is connected to ground via resistor 940 so that the voltage which switch 934 connects to terminal B, when switch driver 920 receives the first input signal, may be produced by directly connecting resistor 940 to terminal B.

Because of the substantial inductance which normally is inherent in coil 930, the transient current through load 926 in the direction of arrow 938 at the time that switching occurs is substantial and produces a sharp voltage pulse across coil 930 which quickly generates the magnetic field and stores sufficient energy so that the mechanical function is accomplished quickly. In embodiments where the coil 930 is associated with a clutch, this transient pulse operates to quickly grab the clutch. Operation in this fashion has been found to greatly improve the life time and reliability of the clutch in contrast to most arrangements in which it is not applied so abruptly.

The current flow through coil 930 in the direction shown by arrow 938 continues with the voltage across coil 930 during the steady state period being sufficient to perform the mechanical function desired. Thereafter, when the second input signal is applied to electronic switch driver 920, a signal is produced and applied by driver 20 to electronic switch 934 which causes switch 934 to apply a voltage to terminal B which is a substantial portion of the voltage provided by source 924, and at the same time causes switch 922 to apply a voltage to terminal A which is substantially less than the voltage applied to terminal B, so that the polarity across load 926 is reversed and current begins to flow through load 926 in a direction opposite that shown by arrow 938.

However, as mentioned above, variable resistor 932 is designed to display a high resistance when current is flowing in a direction opposite to that represented by arrow 938, and to display a low resistance when current is flowing in the direction of arrow 938. However, sufficient reverse current does flow through load 926 and coil 930 to apply a small reverse bias voltage across coil 930 which operates to de-magnetize the coil. As mentioned above, this de-magnetization occurs each time that the current is reversed so that the dealy in deactuating a magnetized coil after current ceases flowing through it is eliminated.

Reference is now made to FIG. 8 which shows a detailed schematic of one circuit for carrying out the functions of the circuitry shown in block diagram in FIG. 7 and to FIG. 9 which shows the voltage across the two coils operated by the circuitry of FIG. 2. In this arrangement, driver circuitry 920 includes a transistor 950 which has its base connected via resistor 952 to a slub in terminal 954 which is connected to the slub out terminal shown in FIG. 2B line 232. The base of transistor 950 is also connected to ground via resistor 956. Thus, when the slub in terminal 954 is essentially at ground, transistor 950 is turned on and driven into the saturated region by the voltage existing between the base and the emitter thereof as applied by resistor 960, saturated transistor 950 applies a low voltage, essentially at ground, to the base of transistor 962 via resistor 964 so that transistor 962 is kept in a non-conductive condition. Because transistor 962 is non-conductive, a high voltage is applied to the bases of transistors 965 and 966 so that these transistors are driven deep into their saturation regions, and accordingly ground is effectively applied to the collector of transistor 965 via resistor 940 and to the collector of transistor 966. Since the collector of transistor 966 is essentially at ground, transistor 968 is maintained in its non-conductive state. Further, the collector of transistor 965 is connected to the base of transistor 970 via resistor 969 and line 971 so that transistor 965 applies an input of essentially ground to the base of transistor 970 which keeps transistor 970 in its non-conductive conditon. The base of transistor 972 is connected to the collector of transistor 970, which is connected to power supply line 975 by resistance 974, so that when transistor 970 is non-conductive and transistor 968 is non-conductive, transistor 972 is conductive and applies a high voltage to terminal B of load 926. Power line 975 connects, as shown, to conventional D. C. power supply 24 which includes full wave rectifying diodes 977, fuse 979 and smoothing capacitor 981.

The base of transistor 974 is similarly connected to terminal B via resistor 976 such that when terminal B is at the high voltage and transistor 965 is in its conductive condition, a voltage is applied between the base and emitter of transistor 974 which drives that transistor into its saturation region, thus essentially grounding the e base of transistor 980 via resistor 940 so that that transistor 980 remains in its non-conductive condition. In this fashion, a voltage of a first polarity is established between terminals A and B so that current flows through the load in a direction opposite to that indicated by arrow 938. A capacitance 982 is connected to the collectors of transistors 972 and 980 for preventing the voltage at that point for collapsing too rapidly when the electronic switches which include these transistors shift from their first to second output conditions to reverse the polarity of voltage across load 926 and the direction of current flow through that load.

When terminal B is at a higher voltage than terminal A as described above, current flows in a direction opposite to that indicated by arrow 938 through load 926 and more particularly through a first circuit comprised of parallel connected resistor 986 and diode 988, which are connected in series with a slub clutch coil 990, and through a second circuit comprised of a further parallel connected resistor 994 and diode 996, which are connected in series as shown with a space clutch coil 1000. Resistor 986 and diode 988 in effect form a variable resistance element which has a relatively low resistance when current flows through load 926 in the direction of arrow 938, and diode 988 shunts resistor 986. Conversely, when current flows through element 986, 988 and slub clutch coil 990 in a direction opposite to that indicated by arrow 938, no current flows through diode 988, which is biased in its non-conductive condition, and the resistance presented by the parallel connected resistor 986 and diode 988 is substantial. Thus, when current flows through load 926 in the direction indicated by an arrow 938, the voltage drop across slub clutch coil 990, as shown in FIG. 9, is essentially the voltage drop across the terminals A and B of load 926, and when current flows in the opposite direction the voltage drop across slub clutch coil 990 is a small portion thereof and is of an opposite polarity.

The circuit is connected such that when current flows in the direction of arrow 938 and the voltage across slub clutch coil 990 is essentially the voltage between terminals A and B of load 926, the energy which the coil stores is sufficient to perform the mechanical function of the coil. When current flows in the opposite direction, the voltage across slub clutch coil 990 is just sufficient to de-magnetize that coil as discussed above. A resistor 1004 and neon light 1006 are connected in parallel with the slub clutch coil 990 in order to indicate when slub clutch coil 990 is in operation.

Similarly, a second coil 1000, termed the space clutch coil, is connected in series with resistance 994 and diode 996 as shown, such that when the voltage at terminal B exceeds the voltage at terminal A, the parallel connected resistor 994 and diode 996 present a relatively low resistance because diode 996 essentially shunts resistor 994 so that the voltage across space clutch coil 1000 is essentially the voltage between terminals A and B, and the clutch associated with coil 1000 is actuated to perform its mechanical function. Similarly, when current flows through load 926 in the direction of arrow 938 and the voltage at terminal A is greater than the voltage at terminal B, the resistance presented by the parallel connected resistor 994 and diode 996 is substantial, such that a small residual voltage across coil 1000 results which is of an opposite polarity and which is sufficient to de-magnetize the coil. In the particular configuration shown in FIG. 8, the two coils 990 and 1000 are actuated and de-magnetized alternately with one coil being de-magnetized while the other coil is actuated. The manner in which these coils cause slubs and spaces to be produced is set forth fully above. A variable resistor 1010 is connected in series with load 926 for varying the current flow through the load to any desired level.

When a second signal is supplied a slub in terminal 954 which is high with respect to ground, transistor 950 is driven into its non-conductive region thus causing a high voltage to be applied to the base of transistor 962 which becomes conductive, applying ground to the base of transistor 966 and to the base of transistor 965. Both of these transistors are thus driven into their non-conductive states. The shifting of transistor 966 from its conductive to its non-conductive condition applies a high input to the base of transistor 968 whose emitter is connected to ground by resistor 940 so that transistor 968 shifts to its conductive condition applying a low voltage essentially at ground to terminal B. The voltage at terminal B is applied to the base of transistor 974 via resistor 976 so that transistor 974 is similarly driven into its non-conductive region, permitting transistor 980 to become conductive and applying a high voltage to terminal A.

Similarly, a high voltage is now applied to the base of transistor 970 via line 971 and resistor 969 such that transistor 970 is driven into its conductive region, in turn causing transistor 972 to become non-conductive. The current now flows through load 926 from terminal A to terminal B via terminal 980, transistor 968 and resistor 940. Thus the current applied across the terminals A and B is the same in each instance; only the polarity of the voltage across load 926 has been changed.

Control in terminals 1020 and 1022 can be employed to hold the circuit in either of its output conditions regardless of the input applied to terminal 954. If a high input is applied to terminal 1022 that input remains as the input to the base of transistor 962, regardless of whether or not transistor 950 is thereafter driven into its conductive region in response to a low input at slub in terminal 954. Similarly, when a high input is applied to control in terminal 1020, transistor 1022 is driven into its conductive condition and applies a voltage of essentially ground to the input of transistor 962 so that that transistor remains in a non-conductive condition.

As mentioned above, while this particular circuit has been found to be especially advantageous in controlling the operation of clutches which are employed in making slub yarn, such circuitry can be employed in a wide variety of applications for controlling any of a number of different devices such as clutches, brakes, etc. in which current through a coil or the like is employed to store energy in a magnetic field and use that energy to perform a mechanical function. For example, the circuit has also been found to be particularly successful in operating the feed circuit on a drapery cutting table where the circuit is actuated by a push button to operate an electric clutch with the clutch delivering a specified length of cloth to the cutting table. Once the specified length is reached, the circuit is switched by a photocell unit to relieve the clutch and act as a brake. The fast switching characteristics of the circuit shown in FIG. 8 have been found to substantially improve the accuracy of control of this device, as compared to conventional relay type switches previously used on cutting table controls.

This circuit has been found to provide very fast switching as compared to well known micro-switch and relay switching characteristics, both because of the relatively high transient voltage which is applied across the coil to actuate it, and the small reversible polarity voltage which is applied across the coil, when the circuit is not in operation, to de-magnetize it. It has been found that this circuit provides an impulse voltage up to 150 percent of the operating voltage in switching brakes, clutches and solenoid, and this permits increased speed in magnetic field build-up and increases speed in operation of the device. This circuit, of course, has no moving parts and has been found to be capable of dissipating switching power troubles caused by stored energy without any harm to the circuit. In the specific circuit of FIG. 9, representative values are given for each of the elements but no limitation to these values is intended.

Many changes and modifications of the above embodiments of this invention can, of course, be made without departing from the scope of the invention and accordingly, that scope is intended to be limited only by the scope of the appended claims.

What is claimed is:

1. A counting circuit comprising:

first counter means for providing at an output a first output signal upon each receipt of a given number of input signals, second counter means connected to the output of said first counter means for receiving successive first output signals from said first counter means and providing, when an enabling input signal is provided at an enabling input, a second output signal at an output upon each receipt of a given number of said first output signals, third counter means connected to the output of said first counter means for receiving successive first output signals from said first counter means and providing, when an enabling input signal is provided at an enabling input, a third output signal at an output upon each receipt of a predetermined number of said first output signals from said first counter means, flip-flop means connected to the output of said second counter means and to said enabling inputs of said second and third counters for shifting from a first to a second output condition, whenever said second output signal is provided by said second counter means and said flip-flop means is in said first condition, to provide an enabling input signal to said third counter means and no input enabling signal to said second counter means means connected to said flip-flop means for providing a signal for shifting said flip-flop means from said second to said first condition to provide an enabling input signal to said second counter means and no input enabling signal to said third counter means, first switch means connected to said second counter means for manually varying said given number of received first output signals upon receipt of which said second counter means provides one of said second output signals, second switch means connected to said third counter means for manually varying said predetermined number of received first output signals upon receipt of which said third counter means provides one of said third output signals, third switch means connected to said first counter means for manually varying said given number of input signals upon receipt of which said first counter means provides one of said first output signals, said third switch means having a plurality of positions and logic means connecting said third switch means to said first counter means and connected to said flip-flop means having, when enabled, a first condition, when said flip-flop means is in said first condition and said third switch means is set in a given position enabling said logic means, said first condition of said logic means causing said first counter means to produce said first output signal upon a first given number and a second condition, when said flip-flop means is in said second condition and said third switch means is set in that given position, and second condition of said logic means causing said first counter means to produce said first output signal upon a second given number different from said first given number.

2. A counting circuit as in claim 1 wherein said logic means is enabled for certain positions of said first and second switches and is disabled for other positions of said first and second switches.

* * * * *